(12) United States Patent
Kamio

(10) Patent No.: US 10,680,541 B2
(45) Date of Patent: Jun. 9, 2020

(54) SHIFT RANGE CONTROL APPARATUS

(71) Applicant: DENSO CORPORATION, Kariya, Aichi-pref. (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/202,428

(22) Filed: Nov. 28, 2018

(65) Prior Publication Data

US 2019/0097554 A1 Mar. 28, 2019

Related U.S. Application Data

(63) Continuation of application No. PCT/JP2017/016324, filed on Apr. 25, 2017.

(30) Foreign Application Priority Data

| May 31, 2016 | (JP) | ................. | 2016-108314 |
| Sep. 9, 2016 | (JP) | ................. | 2016-176274 |
| Feb. 22, 2017 | (JP) | ................. | 2017-030961 |

(51) Int. Cl.
*H02P 6/15* (2016.01)
*F16H 61/32* (2006.01)
*F16H 59/08* (2006.01)
*F16H 63/34* (2006.01)

(52) U.S. Cl.
CPC ............... *H02P 6/15* (2016.02); *F16H 61/32* (2013.01); *F16H 59/08* (2013.01); *F16H 63/3425* (2013.01); *F16H 2061/326* (2013.01)

(58) Field of Classification Search
USPC ....................................... 318/400.13
See application file for complete search history.

(56) References Cited

U.S. PATENT DOCUMENTS

2005/0174084 A1* 8/2005 Nakai ..................... F16H 61/32
                                                       318/632
2015/0000449 A1  1/2015 Sakaguchi et al.

* cited by examiner

*Primary Examiner* — Jorge L Carrasquillo
(74) *Attorney, Agent, or Firm* — Nixon & Vanderhye P.C.

(57) ABSTRACT

A shift range control apparatus includes: an idling determination portion that determines, based on a motor angle and an output shaft angle, an end of an idling state in which a motor is rotating within a range of a play, the motor angle being a value based on a detected value of a motor rotation angle sensor that detects the rotation of the motor, the output shaft angle being a value based on a detected value of an output shaft sensor that detects rotation of the output shaft; and a target value setting portion that sets a motor angle target value for drive control of the motor using a corrected angle value that is a value corresponding to the motor angle at an end of an idling.

9 Claims, 14 Drawing Sheets

SHIFT RANGE CONTROL APPARATUS

CROSS REFERENCE TO RELATED APPLICATION

The present application is a continuation application of International Patent Application No. PCT/JP2017/016324 filed on Apr. 25, 2017, which designated the U.S. and claims the benefit of priority from Japanese Patent Application No. 2016-108314 filed on May 31, 2016, Japanese Patent Application No. 2016-176274 filed on Sep. 9, 2016, Japanese Patent Application No. 2017-030961 filed on Feb. 22, 2017. The entire disclosures of all of the above applications are incorporated herein by reference.

TECHNICAL FIELD

The present disclosure relates to a shift range control apparatus.

BACKGROUND ART

A motor controller that controls a motor as the drive power source of a range switching mechanism has been known. For example, two F/B control systems are provided. A first F/B control system corrects a target motor rotation angle in accordance with an amount of play in the rotation transmission mechanism, using a deviation between an output shaft rotation angle detected by an output shaft sensor and a target rotation angle of the output shaft.

SUMMARY OF INVENTION

It is an object of the present disclosure to provide a shift range control apparatus capable of precisely switching shift ranges.

According to one aspect of the present disclosure, a shift range control apparatus changes shift ranges by controlling drive of a motor in a shift range switching system where a play exists between a motor shaft that is a rotation shaft of the motor and an output shaft to which rotation of the motor is transmitted.

Based on a motor angle and an output shaft angle, an end of an idling state in which the motor is rotating within a range of the play is determined.

A motor angle target value for drive control of the motor using a corrected angle value that is a value corresponding to the motor angle at an end of an idling is set.

BRIEF DESCRIPTION OF DRAWINGS

These and other objects, features and advantages of the present disclosure will become more apparent from the following detailed description with reference to the accompanying drawings. In the drawing.

DESCRIPTION OF EMBODIMENTS

The inventor of the present disclosure has found the following. In order to correct the target motor rotation angle in accordance with an amount of play in the rotation transmission mechanism, the output shaft sensor is required to have high detection accuracy. A wrong correction may be made if there is noise caused by the influence of disturbances or the like in detected values of the output shaft sensor.

A shift range control apparatus will be described with reference to the drawings. Like numerals are given to features that are substantially the same in various embodiments below to omit repeated description.

First Embodiment

The shift range control apparatus according to a first embodiment is shown in FIG. 1 to FIG. 7.

Figure 1:
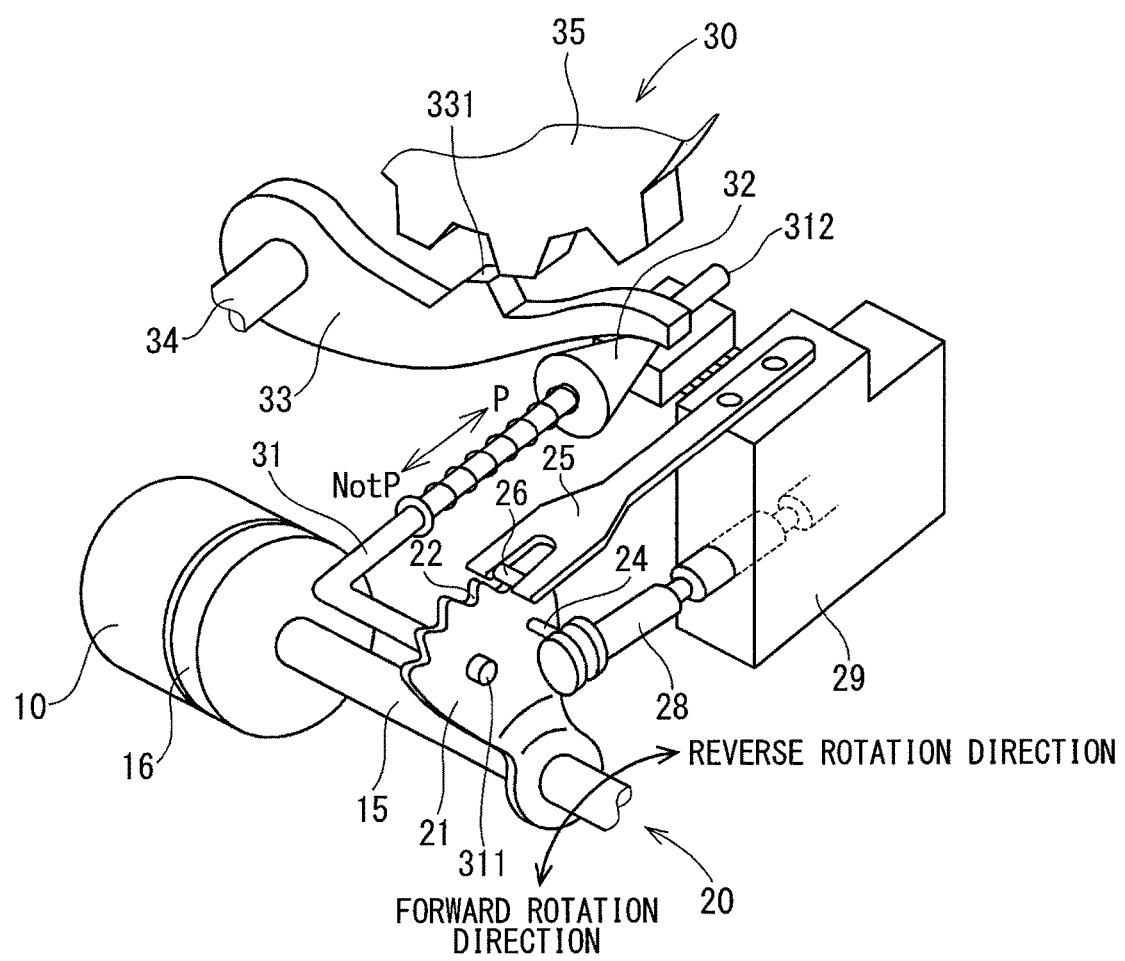
FIG. 1 is a perspective view illustrating a shift-by-wire system according to a first embodiment.
Figure 2:
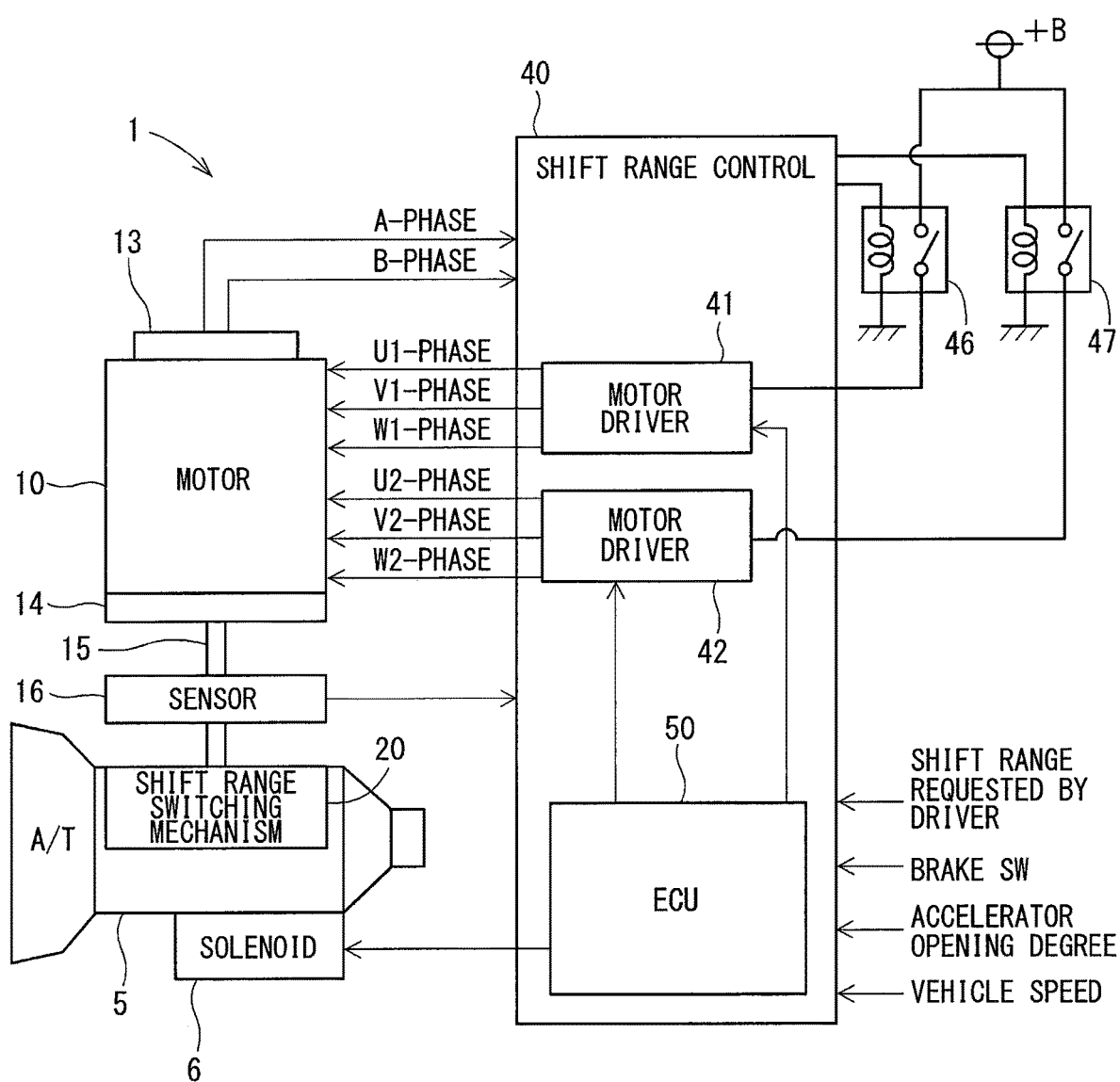
FIG. 2 is a schematic configuration diagram of the shift-by-wire system according to the first embodiment.

As shown in FIG. 1 and FIG. 2, a shift-by-wire system 1 as a shift range switching system includes a motor 10, a shift range switching mechanism 20, a parking lock mechanism 30, a shift range control apparatus 40, or the like.

Figure 3:
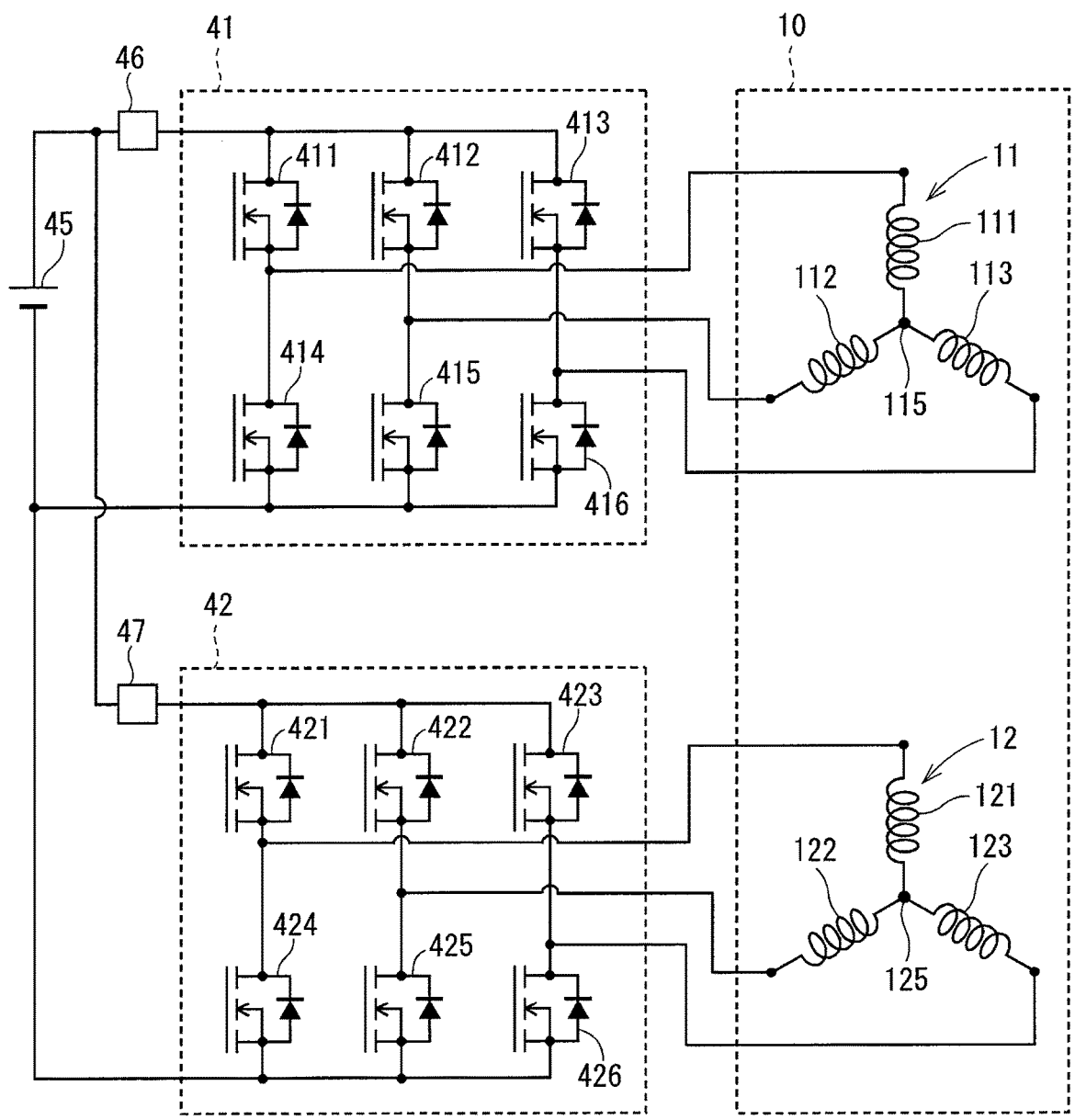
FIG. 3 is a circuit diagram illustrating a motor and a motor driver according to the first embodiment.

The motor 10 is rotated by the power supplied from a battery 45 (referring to FIG. 3) carried in a vehicle (not shown) and functions as the drive source of the shift range switching mechanism 20. The motor 10 is capable of changing the amount of current by feedback control and varying the command for each phase. The motor 10 of the present embodiment is a permanent magnet DC brushless motor. As shown in FIG. 3, the motor 10 includes two sets of windings 11 and 12. The set of primary windings 11 includes a U1 coil 111, a V1 coil 112, and a W1 coil 113. The set of secondary windings 12 includes a U2 coil 121, a V2 coil 122, and a W2 coil 123.

As shown in FIG. 2, an encoder 13 as a motor rotation angle sensor detects the rotating position of a rotor (not shown) of the motor 10. The encoder 13 is a magnetic rotary encoder, for example, which is made up of magnets that rotate with the rotor, hall ICs for detecting magnetic fields, or the like. The encoder 13 outputs A-phase and B-phase pulse signals for each predetermined angle in synchronism with the rotation of the rotor.

A speed reducer 14 is provided between the motor shaft 105 (referring to FIG. 5) of the motor 10 and an output shaft 15 to output the rotation of the motor 10 to the output shaft 15 at a reduced rate. The rotation of the motor 10 is transmitted to the shift range switching mechanism 20. An output shaft sensor 16 is provided to the output shaft 15, and detects the output shaft angle θs that is the angle of the output shaft 15. The output of the output shaft sensor 16 varies continuously in accordance with the number of rotation of the output shaft 15. The output shaft sensor 16 of the present embodiment is a potentiometer whose output varies linearly in accordance with the number of rotation of the output shaft 15.

As shown in FIG. 1, the shift range switching mechanism 20 includes a detent plate 21, a detent spring 25, and the like, and transmits the rotary drive force output from the speed reducer 14 to a manual valve 28 and the parking lock mechanism 30.

The detent plate 21 is fixed to the output shaft 15 and driven by the motor 10. In the present embodiment, the direction in which the detent plate 21 moves away from the proximal end of the detent spring 25 is referred to as a forward rotation direction. The direction in which the detent plate approaches the proximal end is referred to as a reverse rotation direction.

The detent plate 21 has a pin 24 protruding parallel to the output shaft 15. The pin 24 is connected to the manual valve 28. As the detent plate 21 is driven by the motor 10, the manual valve 28 reciprocates along the axial direction. That is, the shift range switching mechanism 20 converts the rotary motion of the motor 10 to linear movement and transmits the converted linear movement to the manual valve 28. The manual valve 28 is provided to a valve body 29. The manual valve 28 reciprocating along the axial direction switches hydraulic pressure supply paths to a hydraulic clutch (not shown) to switch the engaged state of the hydraulic clutch, so that the shift range is changed.

The detent plate 21 has four recesses 22 on the side closer to the detent spring 25, for retaining the manual valve 28 at positions corresponding to respective shift ranges. The recesses 22 each correspond to the respective shift ranges of D (drive), N (neutral), R (reverse), and P (park) ranges from the proximal end of the detent spring 25.

The detent spring 25 is a resiliently deformable plate-like member and has a detent roller 26 provided at its tip. The detent roller 26 fits into one of the recesses 22.

The detent spring 25 presses the detent roller 26 toward the rotation center of the detent plate 21. A rotary force of a predetermined level or more applied to the detent plate 21 deforms the detent spring 25 resiliently to cause the detent roller 26 to move from one recess 22 to another. With the detent roller 26 fitted in one of the recesses 22, the pivoting motion of the detent plate 21 is restricted, which determines the axial position of the manual valve 28 and the state of the parking lock mechanism 30, as well as fixes the shift range of the automatic transmission 5.

The parking lock mechanism 30 includes a parking rod 31, a conical member 32, a parking lock pawl 33, a shaft part 34, and a parking gear 35.

The parking rod 31 is generally L-shaped and one end 311 thereof is fixed to the detent plate 21. The conical member 32 is provided to the other end 312 of the parking rod 31. The conical member 32 is formed such as to be tapered toward the other end 312. When the detent plate 21 pivots in the reverse rotation direction, the conical member 32 moves toward the direction of arrow P.

The parking lock pawl 33 abuts on a conical surface of the conical member 32 and is pivotable around the shaft part 34. On the side facing the parking gear 35, the parking lock pawl 33 has a protrusion 331 that can mesh with the parking gear 35. When the detent plate 21 rotates in the reverse rotation direction, the conical member 32 moves in the direction of arrow P, and the parking lock pawl 33 is pushed up so that the protrusion 331 meshes with the parking gear 35. When the detent plate 21 rotates in the forward rotation direction and the conical member 32 moves in the direction of arrow "Not P", the protrusion 331 is disengaged from the parking gear 35.

The parking gear 35 is provided to an axle (not shown) such as to be capable of meshing with the protrusion 331 on the parking lock pawl 33. The parking gear 35 meshing with the protrusion 331 restricts the rotation of the axle. When the shift range is one of the ranges other than P (Not P range), the parking gear 35 is not locked by the parking lock pawl 33, so that the rotation of the axle is not stopped by the parking lock mechanism 30. When the shift range is the P range, the parking gear 35 is locked by the parking lock pawl 33 so that the rotation of the axle is restricted.

As shown in FIG. 2 and FIG. 3, the shift range control apparatus 40 includes motor drivers 41 and 42, an ECU 50, or the like.

The motor driver 41 is a three-phase inverter having bridge-connected switching devices 411 to 416 for selectively applying power to the set of primary windings 11. One end of the U1 coil 111 is connected to a connection point between the pair of U-phase switching devices 411 and 414. One end of the V1 coil 112 is connected to a connection point between the pair of V-phase switching devices 412 and 415. One end of the W1 coil 113 is connected to a connection point between the pair of W-phase switching devices 413 and 416. The other ends of the coils 111 to 113 are connected at a connection 115.

The motor driver 42 is a three-phase inverter having bridge-connected switching devices 421 to 426 for selectively applying power to the set of secondary windings 12. One end of the U2 coil 121 is connected to a connection point between the pair of U-phase switching devices 421 and 424. One end of the V2 coil 122 is connected to a connection point between the pair of V-phase switching devices 422 and 425. One end of the W2 coil 123 is connected to a connection point between the pair of W-phase switching devices 423 and 426. The other ends of the coils 121 to 123 are connected at a connection 125.

While the switching devices 411 to 416 and 421 to 426 in the present embodiment are MOSFETs, other devices such as IGBTs may also be used.

A motor relay 46 is provided between the motor driver 41 and the battery 45. A motor relay 47 is provided between the motor driver 42 and the battery 45. The motor relays 46 and 47 are turned on when a starter switch, such as an ignition switch or the like, is turned on, so that power is supplied to the motor 10. The motor relays 46 and 47 are turned off when the starter switch is turned off, so that power supply to the motor 10 is shut off.

The ECU 50 controls the on/off operations of the switching devices 411 to 416 and 421 to 426, and controls the drive of the motor 10 such that the shift range requested by the driver and input by an operation of a shift lever or the like (not shown) matches the shift range of the shift range switching mechanism 20. The ECU 50 also controls the drive of transmission hydraulic control solenoids 6, based on the vehicle speed, accelerator opening degree, and shift range requested by the driver. The transmission gears are controlled by the control of the transmission hydraulic control solenoids 6. The number of transmission hydraulic control solenoids 6 corresponds to the number of transmission gears and the like. While one ECU 50 controls the drive of the motor 10 and the solenoids 6 in the present embodiment, a motor ECU for controlling the motor 10 and an AT-ECU for controlling the solenoids may be provided separately. The drive control of the motor 10 will mainly be described.

Figure 4:
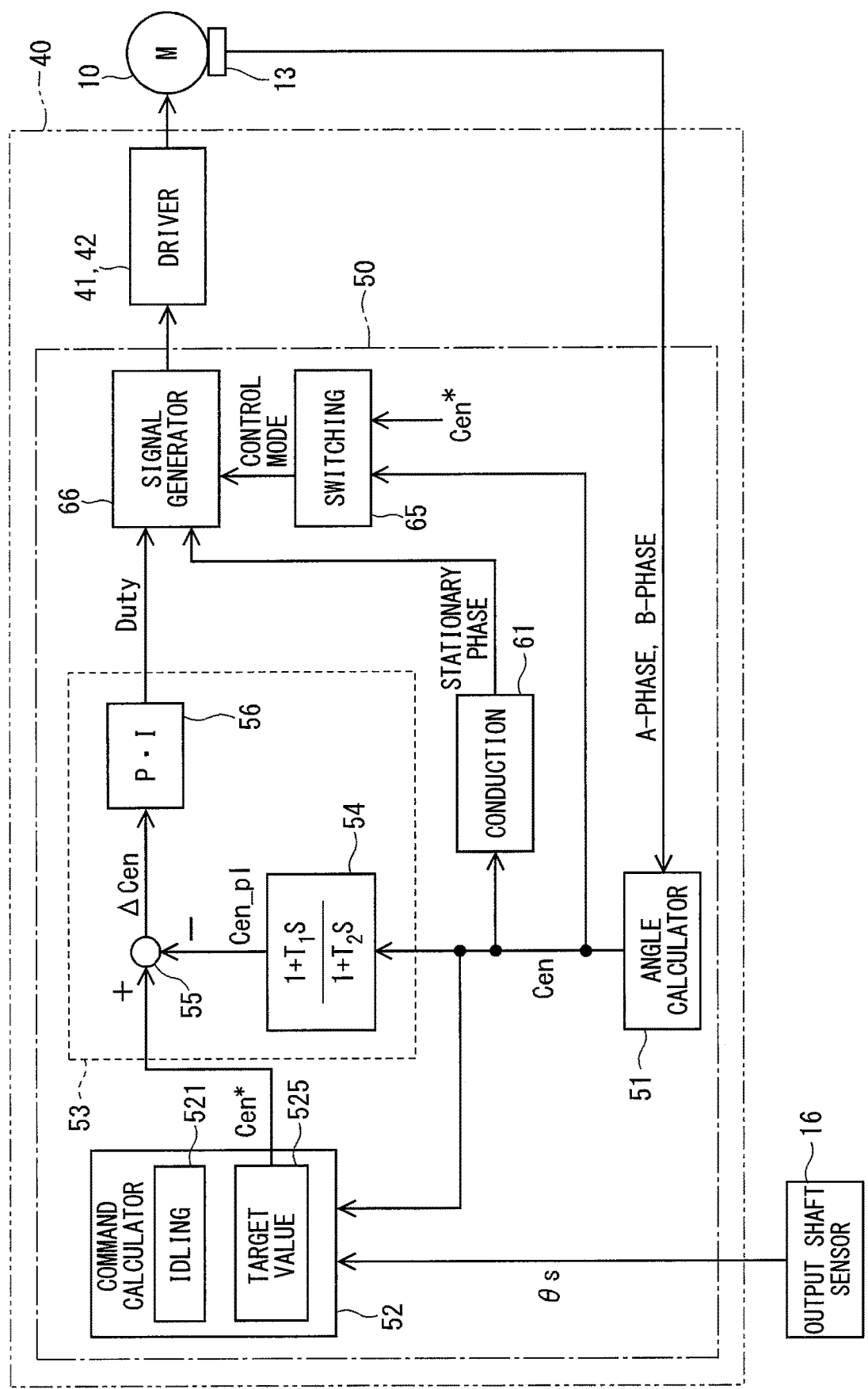
FIG. 4 is a block diagram illustrating a shift range control apparatus according to the first embodiment.

As shown in FIG. 4, the ECU 50 includes an angle calculator 51, a command calculator 52, a feedback controller 53, a stationary phase conduction controller 61, a switching controller 65, a signal generator 66, or the like, and is configured with a microcomputer or the like as a main body. Various processes in the ECU 50 may be software processes of a program already stored in a tangible memory device such as a ROM and executed by a CPU, or may be hardware processes performed by special electronic circuits. Alternatively, various processes in the ECU 50 may be a combination of software processes and hardware processes. In other words, various processes in the ECU 50 may be performed by a processor or a controller.

The angle calculator 51 calculates an actual count Cen that is the count value of the encoder 13, based on the A-phase and B-phase pulses output from the encoder 13. The actual count Cen is a value corresponding to the actual mechanical and electrical angles of the motor 10. In the present embodiment, the actual count Cen is referred to as an "actual angle". The value obtained by converting a mechanical angle of the motor 10 based on the actual count with a gear ratio of the speed reducer 14 is referred to as a "motor angle θm". When the motor 10 and the output shaft 15 are rotating together, the motor angle θm and the output shaft angle θs change similarly.

The command calculator 52 includes an idling determination portion 521 and a target value setting portion 525.

The idling determination portion 521 determines, based on the motor angle θm and the output shaft angle θs, whether the motor is in an idling state where the motor 10 is rotating within a range of play between the motor shaft 105 and the output shaft 15. While FIG. 4 indicates that the actual count Cen and output shaft angle θs are input to the command calculator 52, the motor angle θm converted with a gear ratio may be input instead of the actual count Cen, or, the motor angle θm may be calculated from the actual count Cen inside the command calculator 52. Similarly, the output shaft angle θs may be calculated in the command calculator 52 based on the input detected values of the output shaft sensor 16.

The target value setting portion 525 sets a target count Cen*. The target count Cen* is a value obtained by converting a motor angle target value θcmd, which is a target value of the motor angle θm, into an encoder count. In the present embodiment, the motor angle target value θcmd is a predetermined temporary value θcmd_a corresponding to a shift range before it was switched and a shift range requested by the driver from the time when the shift range requested by the driver was changed until a predetermined duration of time passes after the end of idling. When the predetermined duration of time passed after the end of idling, the motor angle target value θcmd is changed to a value calculated using a corrected angle value θp, which is a value corresponding to the motor angle θm at the end of the idling.

The process of determining the end of idling and the corrected angle value θp will be described in more detail later.

The feedback controller 53 includes a phase advance filter 54, a subtractor 55, and a controller 56, and performs position feedback control.

The phase advance filter 54 performs phase advance compensation for advancing the phase of the actual count Cen and calculates a phase advance value Cen_pl. The phase advance value Cen_pl produced by the phase advance filtering process is also included in the concept of the "actual angle".

The subtractor 55 calculates a deviation ΔCen between the target count Cen* and the phase advance value Cen_pl.

The controller 56 calculates a command duty Du by PI control or the like to make the deviation ΔCen zero so that the target count Cen* and the phase advance value for the actual count Cen_pl match. In the position feedback control, the amount of current conducting through the coils 111 to 113 and 121 to 123 and the torque can be varied by changing the duty through PWM control and the like.

In the present embodiment, the drive of the motor 10 is controlled by a 120° conduction square-wave control scheme. In 120° conduction square-wave control, switching devices on the high potential side of the primary phase and switching devices on the low potential side of the secondary phase are turned on. The combinations of the primary phase (corresponding to a first phase) and secondary phase (corresponding to a second phase) are alternated every 60° electrical angle to switch the conduction phases. This generates rotating magnetic fields in the sets of windings 11 and 12 so that the motor 10 rotates.

The stationary phase conduction controller 61 performs stationary phase conduction control. The stationary phase conduction control is for stopping the rotation of the motor 10, in which a stationary phase corresponding to an electrical angle is selected, and the switching devices 411 to 416 and 421 to 426 are controlled such that current flows in a predetermined direction of the selected stationary phase. This fixes an excitation phase. When an excitation phase is fixed, the motor 10 stops at a predetermined electrical angle corresponding to the excitation phase. The stationary phase conduction controller 61 selects a stationary phase and conduction direction, based on the actual count Cen to stop the motor 10 at an electrical angle closest to the current rotor position.

The stationary phase conduction control is carried out when the difference between the actual count Cen and the target count Cen* becomes an angle determination threshold ENth or lower. Therefore, when stationary phase conduction control is being performed, it can be regarded that the actual count Cen is substantially equal to the target count Cen*. This means that stopping the motor 10 at a nearest possible electrical angle from the current rotor position allows the motor to stop at the location substantially corresponding to the target count Cen*. Strictly speaking, there is a difference, the maximum of which is determined by the motor resolution, between the electrical angle corresponding to the target count Cen* and the electrical angle at which the motor 10 is stopped by the stationary phase conduction control. When the reduction ratio of the speed reducer 14 is large, the difference in the stopping position of the output shaft 15 is negligible.

The switching controller 65 switches the control modes of the motor 10. In the present embodiment, in particular, the switching controller 65 switches between position feedback control and stationary phase conduction control, based on the target count Cen* and actual count Cen.

The switching controller 65 selects the position feedback control as the control mode of the motor 10 when there is a change in the shift range requested by the driver. The switching controller 65 switches the control mode to stationary phase conduction control when the absolute value of the difference between the target count Cen* and the actual count Cen becomes the angle determination threshold ENth or lower. The switching controller 65 maintains the stationary phase conduction control until a duration of conduction time Ta passes from the switching to the stationary phase conduction control. After the duration of conduction time Ta has passed, power-off control is carried out. In this power-off control, all the switching devices 411 to 416 and 421 to 426 are turned off. In the present embodiment, the absolute value of the difference between the target count Cen* and the actual count Cen is equivalent to the "difference value between a target angle and an actual angle".

The signal generator 66 generates a drive signal to turn on or off the switching devices 411 to 416 and 421 to 426 in accordance with the control mode selected by the switching controller 65, and outputs the signal to the motor drivers 41 and 42. The drive of the motor 10 is thus controlled.

Figure 5:
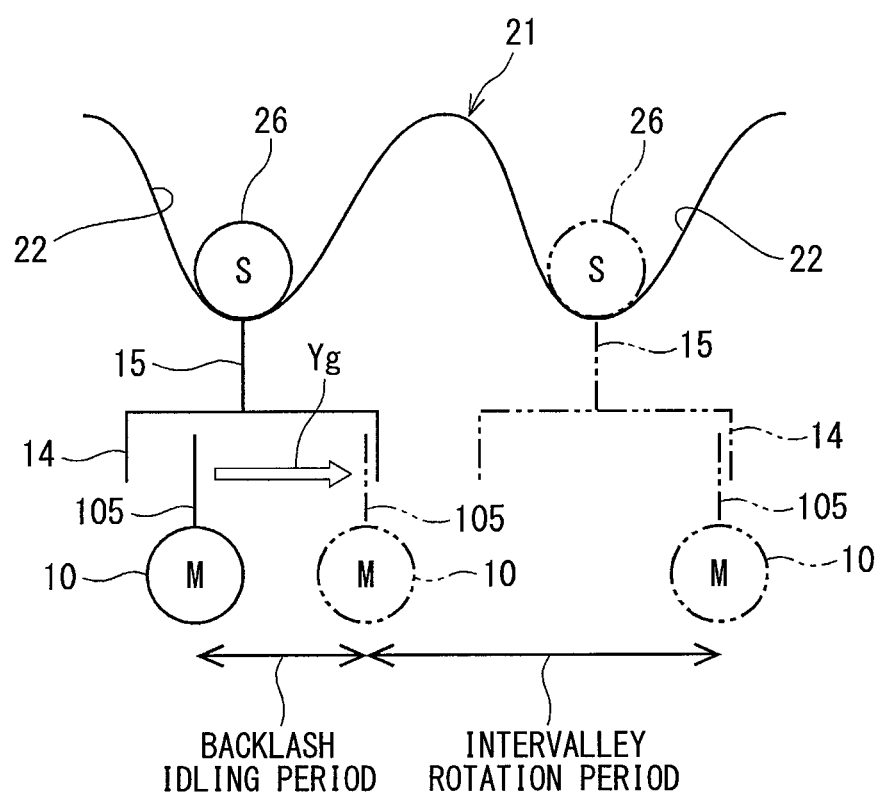
FIG. 5 is a schematic diagram explaining the play between the motor and the output shaft according to the first embodiment.

The relationship between the motor shaft 105 that is the rotation shaft of the motor 10, output shaft 15, and detent plate 21 is shown in FIG. 5. FIG. 5 is a schematic diagram illustrating how the detent roller 26 rides over a ridge between recesses 22 of the detent plate 21 to fit into a recess 22 corresponding to the shift range requested by the driver, as the motor 10 rotates from a state indicated by solid lines to a state indicated by two-dot chain lines. In the description referring to FIG. 5, the rotating direction of the motor 10 and the output shaft 15 will be explained as the left to right direction on the paper plane. FIG. 5 is a schematic diagram that illustrates the concept of "play". The output shaft 15 and speed reducer 14 are integral and the motor shaft 105 is movable within the range of play in the speed reducer 14. It is also possible to configure the motor shaft 105 to be integral with the speed reducer 14 such that there is "play" between the speed reducer 14 and the output shaft 15.

As shown in FIG. 5, the speed reducer 14 is provided between the motor shaft 105 and the output shaft 15, and there is "play" including a gear backlash between the motor shaft 105 and the output shaft 15. In the present embodiment, the motor 10 is a DC brushless motor, so that, sometimes, when power supply to the motor 10 is stopped, the motor shaft 105 rotates within the range of play due to the influence of cogging torque and the like, causing the motor shaft 105 and speed reducer 14 to separate from each other.

When the motor 10 rotates in the state where the motor shaft 105 and the speed reducer 14 are separated from each other in the rotating direction, the motor 10 will be idling until the motor shaft 105 comes into contact with the speed reducer 14 as indicated by arrow Yg, so that the rotation of the motor 10 is not transmitted to the output shaft 15. The state in which the rotation of the motor 10 is not transmitted to the output shaft 15 within the range of play will be referred to as "backlash idling". The period in which the motor is in the backlash idling state will be referred to as a "backlash idling period".

When backlash idling ends, the motor 10, output shaft 15, and detent plate 21 rotate all together. This allows the detent roller 26 to ride over the ridge between the recesses 22 to move into the recess 22 corresponding to the shift range requested by the driver. The period in which the motor 10 and output shaft 15 are rotating together will be referred to as an "intervalley rotation period". While FIG. 5 shows an example where the detent roller 26 moves to an adjacent recess 22, the same applies when it rides over a plurality of ridges.

When power supply to the turned-off motor 10 is started for the switching of shift ranges, it is not possible to specify the location of the motor shaft 105 within the range of "play". Also, the motor 10 needs to be rotated additionally for the backlash idling period as compared to when the motor 10 starts rotating in the state where the motor shaft 105 and speed reducer 14 were in contact with each other.

In the present embodiment, therefore, the end of backlash idling is detected based on the motor angle θm and output shaft angle θs to correct the target count Cen* for securing position control accuracy.

The target correction process of the present embodiment will be described with reference to the flowchart shown in FIG. 6. This process is executed in predetermined cycles at the command calculator 52. The same applies to FIG. 8 and FIG. 9.

In S101, the command calculator 52 processes signals of the motor angle θm and output shaft angle θs. The signal processing is performed in predetermined cycles. The present embodiment will be described on the assumption that the signal processing is performed every 4 ms. In the signal processing, first, filtering is carried out to remove the noise in the motor angle θm and output shaft angle θs. The filtering is an LPF process, for example, and a calculation is made as shown in the following formula 1.

$$Y_i = dt/(dt+T) \times X_i + T/(dt+T) \times Y_{i-1} = K \times X_i + (1-K) \times Y_{i-1} \quad \text{(Formula 1)}$$

X in the formula represents θm or θs before the processing. Y represents θm or θs after the processing. The subscript $_i$ represents a current value, and $_{i-1}$ represents a previous value. T represents a system time constant. If dt=1 [ms], and T=10 [ms], for example, K=1/11.

Instead of the LPF process, an average value of movement during a predetermined period (for example, 8 ms) may be calculated as the filtering.

In the following process steps, values after the filtering will be used as the motor angle θm and output shaft angle θs.

The command calculator 52 calculates a motor angle change amount Δθm that is an amount of change per unit time of the motor angle θm, and an output shaft angle change amount Δθs that is an amount of change per unit time of the output shaft angle θs. It is assumed that Δθm and Δθs are amounts of change in a direction in which the motor 10 and output shaft 15 should be rotated in accordance with the current range and the shift range requested by the driver, and is positive values except for errors or the like.

The command calculator 52 calculates a change amount difference value Dms (referring to Formula 2) that is a difference value between the motor angle change amount Δθm and the output shaft angle change amount Δθs.

$$Dms = \Delta\theta m - \Delta\theta s \quad \text{(Formula 2)}$$

At S102, the command calculator 52 determines whether a conduction flag is turned on. The conduction flag is turned on when there is a change in the shift range requested by the driver, and turned off when the stationary phase conduction control is ended. When it is determined that the conduction flag is on (S102: YES), the process goes to S106. When it is determined that the conduction flag is off (S102: NO), the process goes to S103.

At S103, the command calculator 52 stores the current motor angle θm as an initial drive value θinit in a RAM or the like, and the process goes to S105.

At S104, the command calculator 52 resets the counter value Ck of a duration counter to be described later. If the duration counter has already been reset, the reset state is kept.

At S105, the command calculator 52 turns on a corrected value unset flag Xinit. If the corrected value unset flag Xinit has already been turned on, the ON state is kept.

At S106 the process goes to if it is determined that the conduction flag is on (S102: YES), the command calculator 52 determines whether an absolute value of the difference between the motor angle θm and the initial drive value θinit is smaller than an initial drive determination value θa. Here, it corresponds to determination of whether the detent roller 26 is in the same recess 22 as that before the switching of shift ranges. The initial drive determination value θa is set as required in accordance with the range before the switching and the shape of the detent plate 21. If it is determined that the absolute value of the difference between the motor angle θm and the initial drive value θinit is less than the initial drive determination value θa (S106: YES), the process goes to S107. If it is determined that the absolute value of the difference between the motor angle θm and the initial drive value θinit is not less than the initial drive determination value θa (S106: NO), the process goes to S111.

If it is determined that the absolute value of the difference between the motor angle θm and the initial drive value θinit is less than the initial drive determination value θa (S106: YES), that is, at S107 the process goes to if the detent roller 26 is in the same recess 22 as that before the switching of shift ranges, the idling determination portion 521 determines whether the absolute value of the change amount difference value Dms is less than a correspondence determination threshold Db. The correspondence determination threshold Db is a value set in accordance with an expected difference based on which Δθm and Δθs can be assumed to match (for example, 0.5°/4 ms), in consideration of errors and the like. If it is determined that the absolute value of the change amount difference value Dms is not less than the correspondence determination threshold Db (S107: NO), that is, if the motor angle change amount Δθm and the output shaft angle change amount Δθs do not match, the process goes to S111. If it is determined that the absolute value of the change amount difference value Dms is less than the correspondence determination threshold Db (S107: YES), that is, if the motor angle change amount Δθm and the output shaft angle change amount Δθs match, the process goes to S108.

At S108, the idling determination portion 521 determines whether the motor angle change amount Δθm is equal to or more than a rotation determination threshold Dr. The rotation determination threshold Dr is a value based on which the motor 10 can be assumed to be rotating (for example, 1°/4 ms). If it is determined that the motor angle change amount Δθm is less than the rotation determination threshold Dr (S108: NO), that is, if the motor 10 is not rotating, the process goes to S111. If it is determined that the motor angle change amount Δθm is equal to or more than the rotation determination threshold Dr (S108: YES), that is, if the motor 10 is rotating, the process goes to S109.

At S109, the idling determination portion 521 determines whether the output shaft angle change amount Δθs is equal to or more than the rotation determination threshold Dr. The rotation determination threshold Dr associated with the determination of the output shaft angle change amount Δθs may be a different value from the value associated with the motor angle change amount Δθm. If it is determined that the output shaft angle change amount Δθs is less than the rotation determination threshold Dr (S109: NO), that is, if the output shaft 15 is not rotating, the process goes to S111. If it is determined that the output shaft angle change amount Δθs is equal to or more than the rotation determination threshold Dr (S109: YES), the process goes to S110.

At S110, the command calculator 52 determines whether the corrected value unset flag Xinit is turned on. If it is determined that corrected value unset flag Xinit is off (S110: NO), the process goes to S111. If it is determined that corrected value unset flag Xinit is on (S110: YES), the process goes to S112.

At S111 the process goes to if the absolute value of a difference between the motor angle θm and the initial drive value θinit is not less than the initial drive determination value θa (S106: NO), or if the motor angle change amount Δθm and the output shaft angle change amount Δθs do not match (S107: NO), or if at least one of the motor 10 and the output shaft 15 is not rotating (S108: NO, or S109: NO), or if the corrected value unset flag Xinit is off (S110: NO), the counter value Ck of the duration counter is reset.

At S112, the command calculator 52 determines the current value of the motor angle θm to be the corrected angle value θp, and stores the corrected angle value θp in the RAM or the like.

At S113, the command calculator 52 turns off the corrected value unset flag Xinit.

That is, in the present embodiment, it is assumed that backlash idling has ended when a state is achieved first time, where the motor angle change amount Δθm and the output shaft angle change amount Δθs match, as well as the motor 10 and output shaft 15 are both rotating. The motor angle θm at this time is stored as the corrected angle value θp.

At S114, the command calculator 52 increments the counter value Ck of the duration counter.

At S115, the command calculator 52 determines whether the counter value Ck of the duration counter equals to a duration determination value Cth. If it is determined that the counter value Ck is less than the duration determination value Cth (S115: NO), the step of S116 is not carried out. If it is determined that the counter value Ck is equal to or more than the duration determination value Cth (S115: YES), the process goes to S116.

At S116, the target value setting portion 525 calculates a motor angle target value θcmd (referring to Formula 3) using the corrected angle value θp. θdet in the formula represents a design value set corresponding to the angle of the intervalley rotation period in accordance with the shift range before the switching and the shift range requested by the driver.

$$\theta cmd = \theta p + \theta det \quad \text{(Formula 3).}$$

Figure 7:
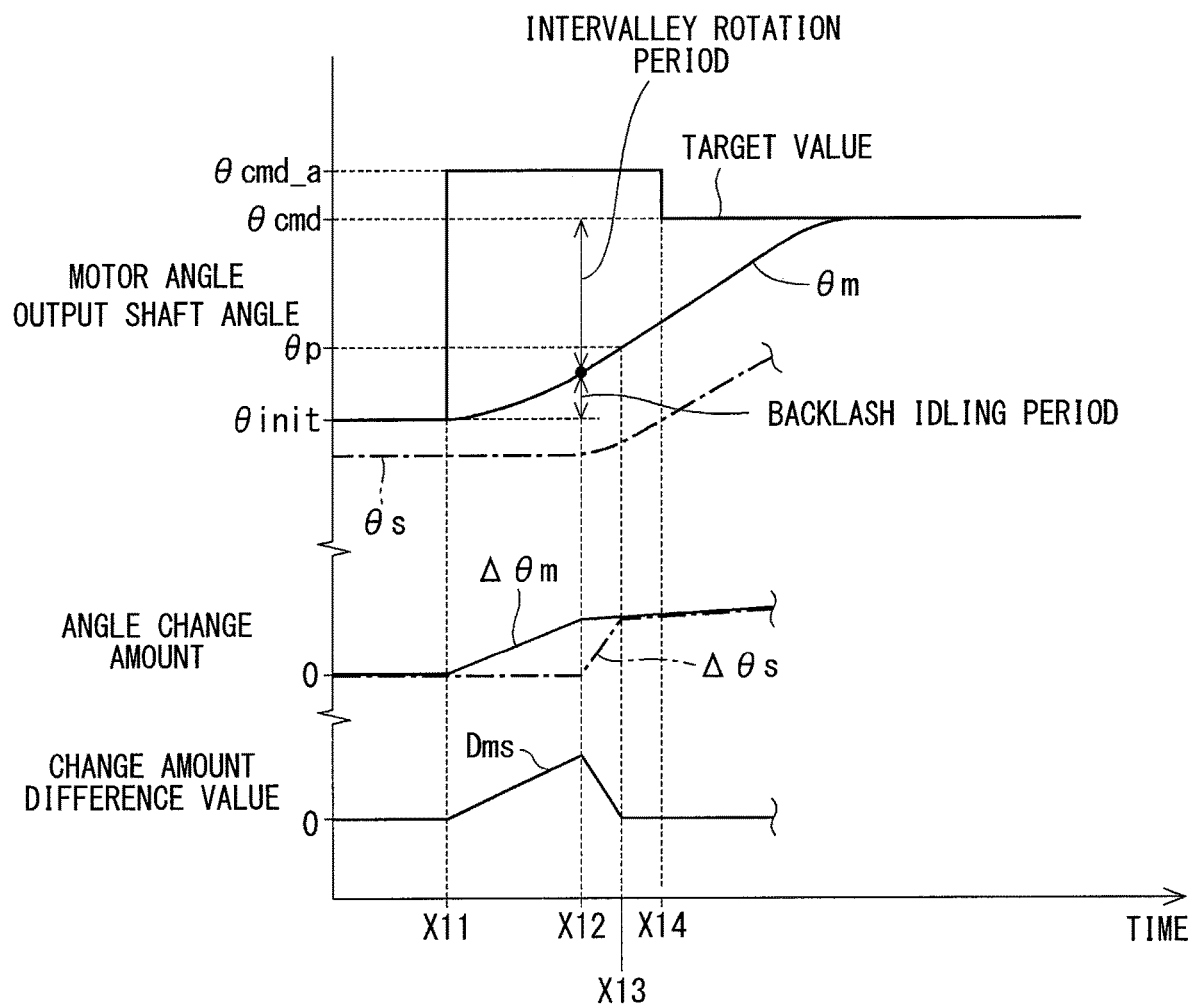
FIG. 7 is a time chart explaining the target correction process according to the first embodiment.

The target value correction process of the present embodiment will be described with reference to the time chart of FIG. 7. FIG. 7 shows the motor angle θm, output shaft angle θs, angle change amounts Δθm and Δθs, and change amount difference value Dms, the horizontal axis representing a common time axis. For convenience of explanation, the time scale and the like is changed as required, that is, the time does not necessarily correspond to the actual time. The same applies to FIG. 10, FIG. 13, and FIG. 14 to be described later.

At time x11, the shift range requested by the driver is changed, the conduction flag that has been off is turned on, and a motor angle target value is set. The target value set here is a temporary value θcmd_a. Once the temporary value θcmd_a is set and the motor 10 is driven with position feedback control, the motor angle θm changes so that the motor angle change amount Δθm≠0, as indicated by the motor angle θm, output shaft angle θs, and angle change amounts Δθm and Δθs in FIG. 7. The output shaft angle θs on the other hand does not change, since the rotation of the motor 10 is not transmitted to the output shaft 15 during the backlash idling, so that the output shaft angle change amount Δθs continues to be 0. The change amount difference value Dms increases during the backlash idling period as indicated by the change amount difference value Dms in FIG. 7.

At time x12 when the backlash idling ends, the rotation of the motor 10 starts to be transmitted to the output shaft 15 so that the output shaft 15 starts to rotate, that is, the output shaft angle θs starts to change, and output shaft angle change amount Δθs≠0. At time x13, the motor angle change amount Δθm becomes equal to the output shaft angle change amount Δθs, so that the change amount difference value becomes zero. In the present embodiment, it is determined that backlash idling has ended at time x13 when the motor angle change amount Δθm and the output shaft angle change amount Δθs substantially match, and the motor angle change amount Δθm and the output shaft angle change amount Δθs are both equal to or more than the rotation determination threshold Dr, and the motor angle θm at this time is used as the corrected angle value θp.

At time x14 after a duration of time corresponding to the duration determination value Cth has passed from time x13, the target value is corrected using the corrected angle value θp, and the motor angle target value θcmd is changed to a value obtained by Formula 3. From then on, the motor 10 is controlled such that the motor angle θm equals to the motor angle target value θcmd. While the motor angle target value θcmd is corrected to be smaller than the temporary value θcmd_a in FIG. 7, θcmd may be corrected to be greater than the temporary value θcmd_a depending on the setting and the like of the temporary value θcmd_a.

In the present embodiment, the end of backlash idling is determined based on the amount of change in the motor angle θm and output shaft angle θs, and the target value is corrected based on the motor angle θm at the time when it is determined that the backlash idling has ended. Thus, the motor angle target value θcmd can be set appropriately without a process of learning the amount of play, for example, the process in which the amount of play is determined by rotating the motor in both directions until both ends of the play are brought in to contact therewith.

If, as a comparative example, the motor angle target value θcmd is set using the output shaft angle θs itself, the output shaft sensor 16 is required to be able to detect the absolute angle with high accuracy. In the present embodiment, on the other hand, the end of backlash idling is detected based on the amount of change in the motor angle θm and output shaft angle θs, and the motor angle θm at the end of the backlash idling is used as the corrected angle value θp, that is, only the amount of change needs to be detected appropriately. As compared to the case where the value of the output shaft angle θs itself is used, the accuracy requirements can be made less stringent.

If, as another comparative example, the end of backlash idling is detected in accordance with the amount of change in the output shaft angle θs based on which the target value is corrected, there is a risk of erroneous determination of the end of backlash idling due to possible noise in the detected value caused by the influence of disturbances or the like. The present embodiment employs a multiple different type sensor system that uses the motor angle θm based on the detected value of the encoder 13 and the output shaft angle θs based on the detected value of the output shaft sensor 16. Since the end of backlash idling is determined based on the amount of changes in the motor angle θm and output shaft angle θs, an erroneous determination of the end of backlash idling caused by disturbance noise, or an erroneous correction of the motor angle target value θcmd, can be avoided.

As described above, in the shift-by-wire system 1 where there is a play between the motor shaft 105 that is the rotation shaft of the motor 10 and the output shaft 15 to which the rotation of the motor 10 is transmitted, the shift range control apparatus 40 switches shift ranges by controlling the drive of the motor 10 such that the motor angle θm that is the rotation angle of the motor 10 will match the motor angle target value θcmd. The shift range control apparatus 40 includes an idling determination portion 521 and a target value setting portion 525.

The idling determination portion 521 determines the end of idling where the motor 10 is rotating within the range of play, based on the motor angle θm, which is a value based on the detected value of the encoder 13 that detects the rotation of the motor 10, and on the output shaft angle θs, which is a value based on the detected value of the output shaft sensor 16 that detects the rotation of the output shaft 15.

The target value setting portion 525 sets a motor angle target value θcmd for the drive control of the motor 10, using a corrected angle value θp that is a value corresponding to the motor angle θm at the end of the idling.

In the present embodiment, the end of an idling state is determined using the motor angle θm and output shaft angle θs, and the motor angle target value θcmd is set based on the motor angle θm at the end of the idling. This enables appropriate setting of a motor angle target value θcmd without a process of learning the amount of play. The motor angle θm and output shaft angle θs, which are two different types of detected values, are used for the determination of the end of the idling. As compared to the case where determination is made using only the output shaft angle θs, the detection accuracy requirements of the output shaft angle θs can be made less stringent, and erroneous setting of a motor angle target value θcmd caused by the influence of disturbance noise or the like can be prevented.

Figure 6:
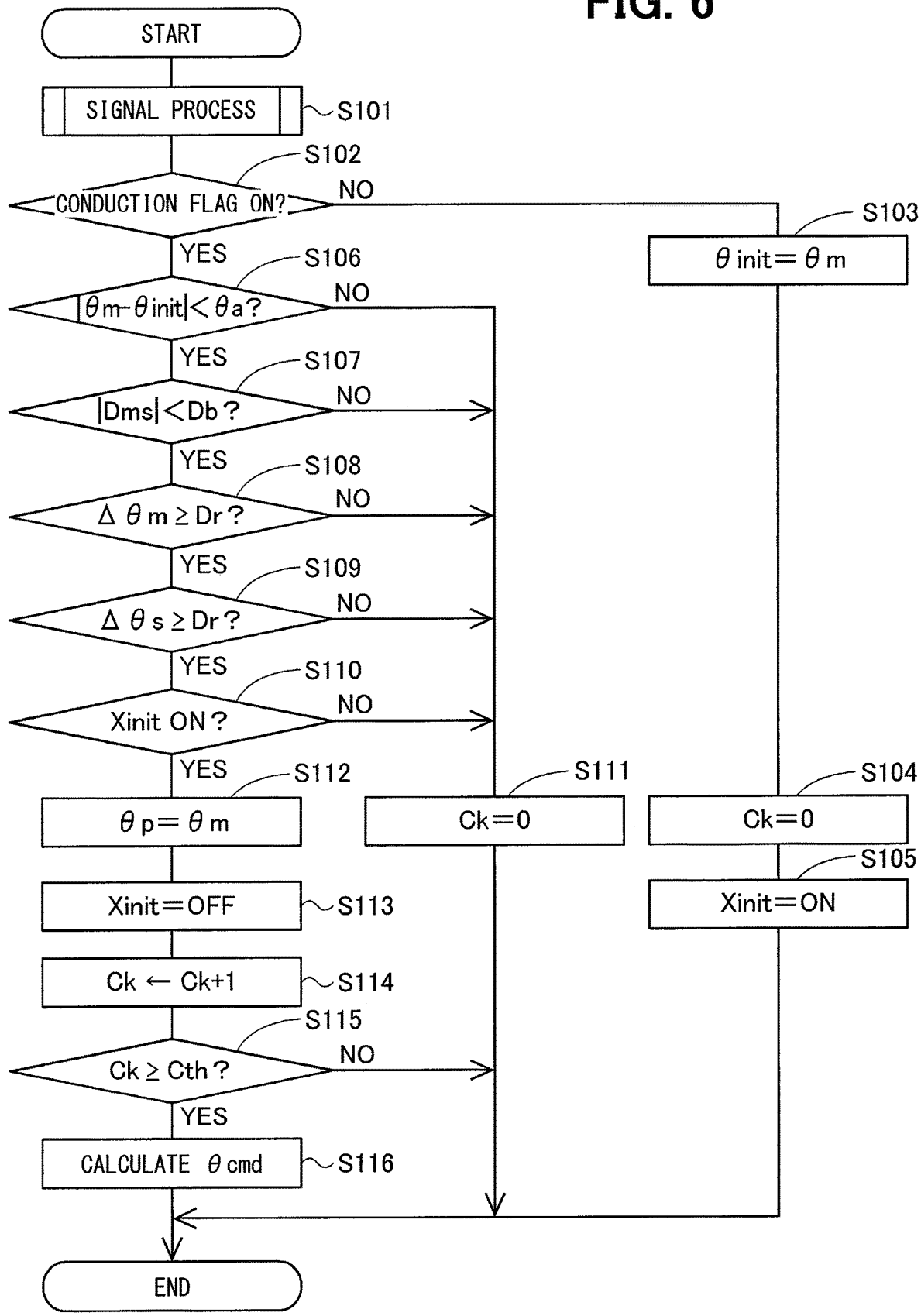
FIG. 6 is a flowchart explaining a target correction process according to the first embodiment.

The idling determination portion 521 determines that the idling state has ended when the motor angle change amount Δθm, which is an amount of change per unit time of the motor angle θm, is equal to the output shaft angle change amount Δθs, which is an amount of change per unit time of the output shaft angle θs (S107 in FIG. 6: YES), as well as the motor angle change amount Δθm and output shaft angle change amount Δθs are both equal to or more than the rotation determination threshold Dr (S108: YES, and S109: YES).

Thus, the end of the idling state can be determined appropriately.

Second Embodiment

Figure 8:
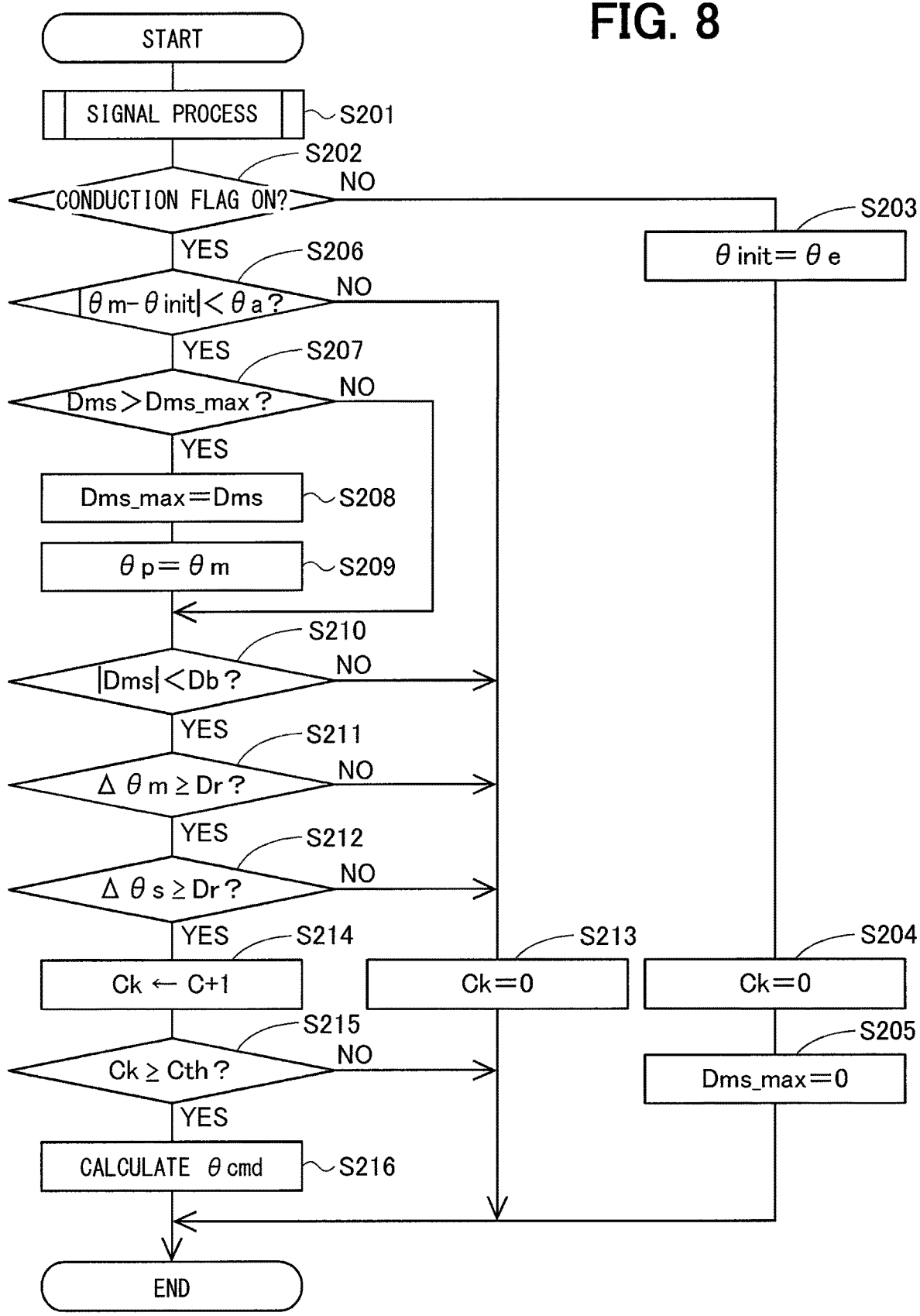
FIG. 8 is a flowchart explaining a target correction process according to a second embodiment.

A second embodiment will be described with reference to FIG. 8. The present embodiment differs in the target correction process. Thus, the different feature will mainly be described.

The target correction process of the present embodiment will be described with reference to the flowchart shown in FIG. 8.

The steps from S201 to S204 are the same as those from S101 to S104 in FIG. 6.

At S205, the command calculator 52 changes a maximum value of the change amount difference Dms_max to zero.

The step of S206 is the same as that of S106 in FIG. 6.

At S207 the process goes to if it is determined that the absolute value of a difference between the motor angle θm and the initial drive value θinit is less than the initial drive determination value θa (S206: YES), the command calculator 52 determines whether a current value of the change amount difference value Dms is greater than the maximum value of the change amount difference value Dms_max stored in a RAM or the like. If it is determined that the current value of the change amount difference value Dms is not more than the maximum value of the change amount difference value Dms_max (S207: NO), the process goes to S210. If it is determined that the current value of the change amount difference value Dms is greater than the maximum value of the change amount difference value Dms_max (S207: YES), the process goes to S208.

At S208, the command calculator 52 stores, in the RAM or the like, the current value of the change amount difference value Dms as the maximum value of the change amount difference value Dms_max.

At S209, the command calculator 52 determines the current value of the motor angle θm to be the corrected angle value θp, and stores the corrected angle value θp in the RAM or the like.

The steps from S210 to S212 are the same as those from S107 to S109 in FIG. 6. If the motor angle change amount Δθm and the output shaft angle change amount Δθs do not match (S210: NO), or if at least one of the motor angle change amount Δθm and output shaft angle change amount Δθs is smaller than the rotation determination threshold Dr (S211: NO, or S212: NO), the process goes to S213. If the motor angle change amount Δθm and the output shaft angle change amount Δθs match (S210: YES), as well as both of the motor angle change amount Δθm and output shaft angle change amount Δθs are equal to or more than the rotation determination threshold Dr (S211: YES, and S212: YES), the process goes to S214.

The step of S213 is the same as that of S111 in FIG. 6.

The steps from S214 to S216 are the same as those from S114 to S116 in FIG. 6.

In the present embodiment, when the current value of the change amount difference value Dms is greater than the previous maximum value, the maximum value of the change amount difference value Dms_max and the corrected angle value θp are renewed. If the current value of the change amount difference value Dms is not more than the previous maximum value, the steps of S208 and S209 are not carried out, so that the previous maximum value of the change amount difference value Dms_max and corrected angle value θp are retained. This means that the motor angle θm when the change amount difference value Dms is at its peak is retained as the corrected angle value θp. In other words, in the present embodiment, a peak value of the change amount difference value Dms is detected, and the motor angle θm when the change amount difference value Dms is at its peak is used as the corrected angle value θp. That is, in the present embodiment, the motor angle θm at time x12 in FIG. 7 is used as the corrected angle value θp.

Detecting a peak value of change amount difference value Dms can be considered to be equivalent of detecting an inflexion point where the change rate of the motor angle change amount Δθm changes. Also, detecting the change amount difference value Dms can be considered to be equivalent of detecting an inflexion point where the change rate of the output shaft angle change amount Δθs changes.

In the present embodiment, the target value setting portion 525 determines, as the motor angle θm at the end of idling, the motor angle θm when the change amount difference value Dms is at its peak, the change amount difference value Dms being the difference value between the motor angle change amount Δθm and the output shaft angle change amount Δθs, and sets a motor angle target value θcmd using this motor angle θm as the corrected angle value θp.

Thus, the corrected angle value θp can be set appropriately.

The same effects as those of the previously described embodiment can be achieved.

Third Embodiment

A third embodiment will be described with reference to FIG. 9 and FIG. 10. The present embodiment differs in determination of idling in the target correction process. Thus, the different feature will mainly be described.

The target correction process of the present embodiment will be described with reference to the flowchart of FIG. 9. Unlike the first embodiment, FIG. 9 is different from FIG. 6 in that S107 to S109 are replaced with S121 and S122. Alternatively, S210 to S212 in FIG. 8 may be replaced with S121 and S122.

At S101, the command calculator 52 calculates an angle difference value θms (referring to Formula 4) that is the difference between the motor angle θm and the output shaft angle θs, and an angle difference value change amount Δθms that is an amount of change per unit time of the angle difference value θms, in addition to the filtering and the like mentioned above.

$$\theta ms = \theta m - \theta s \quad \text{(Formula 4)}$$

Here, S121 is a step the process goes to if it is determined that the absolute value of the difference between the motor angle θm and the initial drive value θinit is less than the initial drive determination value ea (S106: YES), that is, when the detent roller 26 is in the same recess 22 as that before the switching of shift ranges. At S121, the idling determination portion 521 determines whether the angle difference value θms is greater than a difference determination threshold θb. If it is determined that the angle difference value θms is not more than the difference determination threshold θb (S121: NO), the process goes to S111. If it is determined that the angle difference value θms is greater than the difference determination threshold θb (S121: YES), the process goes to S122.

At S122, the idling determination portion 521 determines whether the angle difference value change amount Δθms is 0. Here, if the angle difference value change amount Δθms is smaller than a determination value that is set in accordance with detection errors and the like, it is deemed that the angle difference value change amount Δθms is 0. If it is determined that the angle difference value change amount Δθms is not 0 (S122: NO), the process goes to S111. If it is determined that the angle difference value change amount Δθms is 0 (S122: YES), the process goes to S110, and successive process steps are carried out.

The target value correction process of the present embodiment will be described with reference to the time chart of FIG. 10. FIG. 10 shows the motor angle θm, output shaft angle θs, angle difference value θms, and angle difference value change amount Δθms, the horizontal axis representing a common time axis. The motor angle θm and output shaft angle θs in FIG. 10 are substantially the same as the motor angle θm and output shaft angle θs of FIG. 7 except for the corrected angle value θp.

At time x21 when the shift range requested by the driver is changed and the motor 10 is driven, the motor angle θm changes during the backlash idling, while the output shaft angle θs does not change. Therefore, as indicated by the angle difference value θms in FIG. 10, the angle difference value θms increases during the backlash idling. At time x22 that is the end of the backlash idling period, the motor 10 and output shaft 15 start to rotate together, so that the angle difference value θms becomes constant as indicated by the angle difference value θms in FIG. 10, and the angle difference value change amount Δθms becomes 0 as indicated by the angle difference value change amount Δθms in FIG. 10.

In the present embodiment, it is determined that backlash idling has ended at time x22 when the angle difference value θms is greater than the difference determination threshold θb as well as the angle difference value change amount Δθms has become 0, and the motor angle θm at this time is used as the corrected angle value θp.

At time x23 after a duration of time corresponding to the duration determination value Cth has passed from time x22, the target value is corrected using the corrected angle value θp. From then on, the motor 10 is controlled such that the motor angle θm equals to the corrected motor angle target value θcmd.

Figure 9:
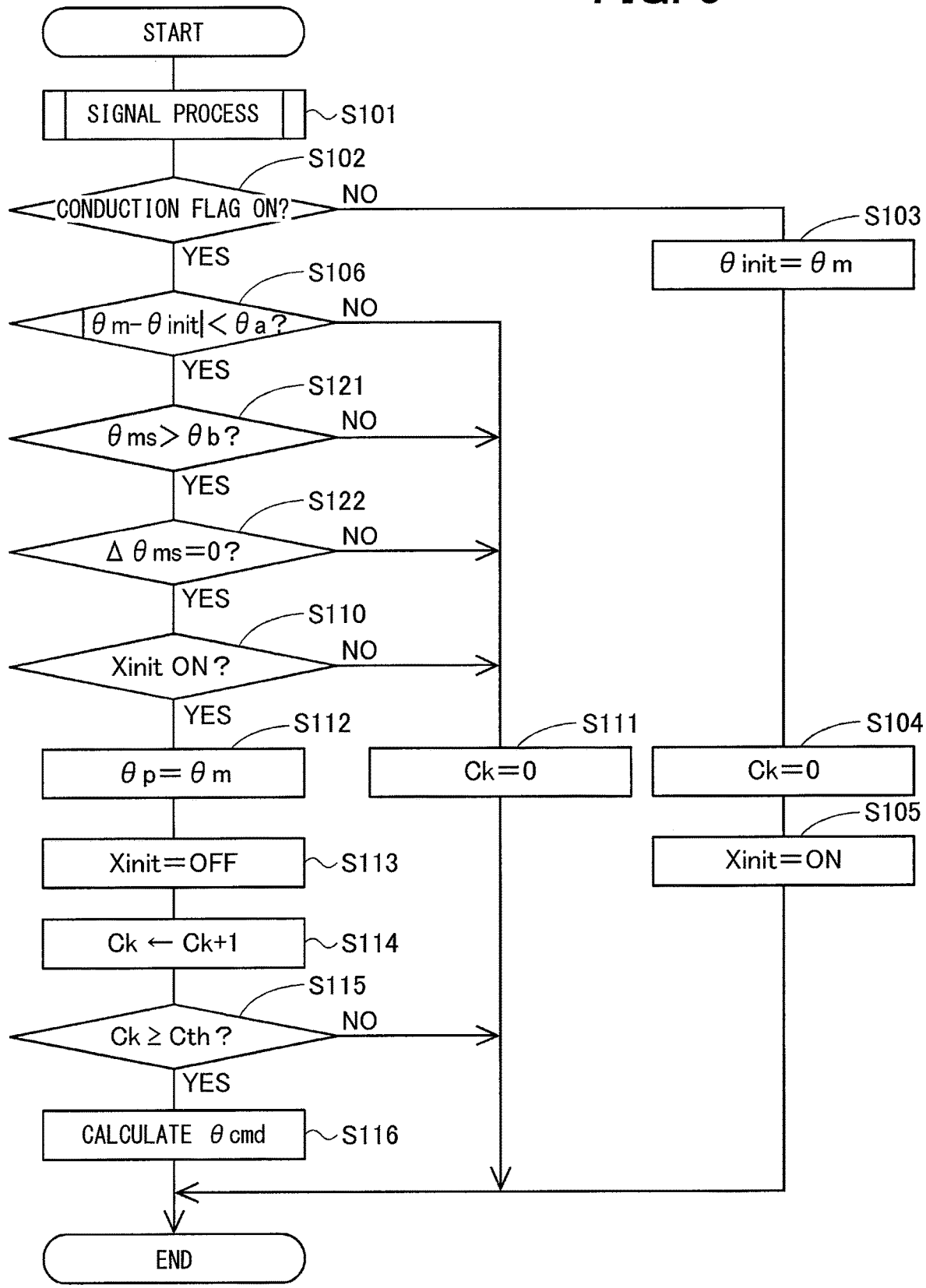
FIG. 9 is a flowchart explaining a target correction process according to a third embodiment.
Figure 10:
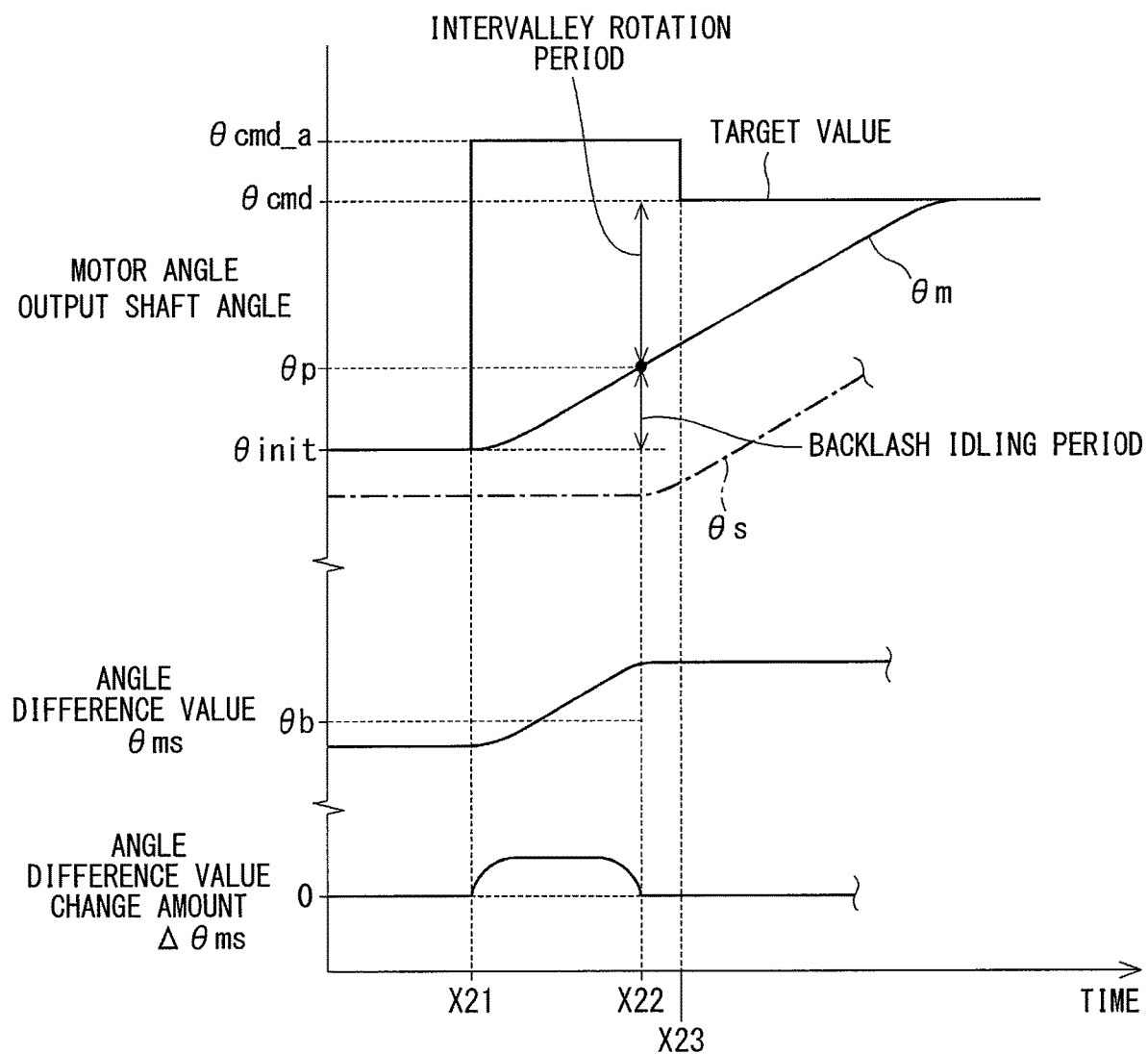
FIG. 10 is a time chart explaining the target correction process according to the third embodiment.

In the present embodiment, the idling determination portion 521 determines that the idling state has ended when the angle difference value θms, which is a difference value between the motor angle θm and the output shaft angle θs, is greater than the difference determination threshold θb (S121 in FIG. 9: YES), as well as the angle difference value change amount Δθms, which is an amount of change per unit time of the angle difference value θms, has become 0.

Also in this manner, the end of the idling state can be determined appropriately.

The same effects as those of the previously described embodiment can be achieved.

Fourth Embodiment

Figure 11:
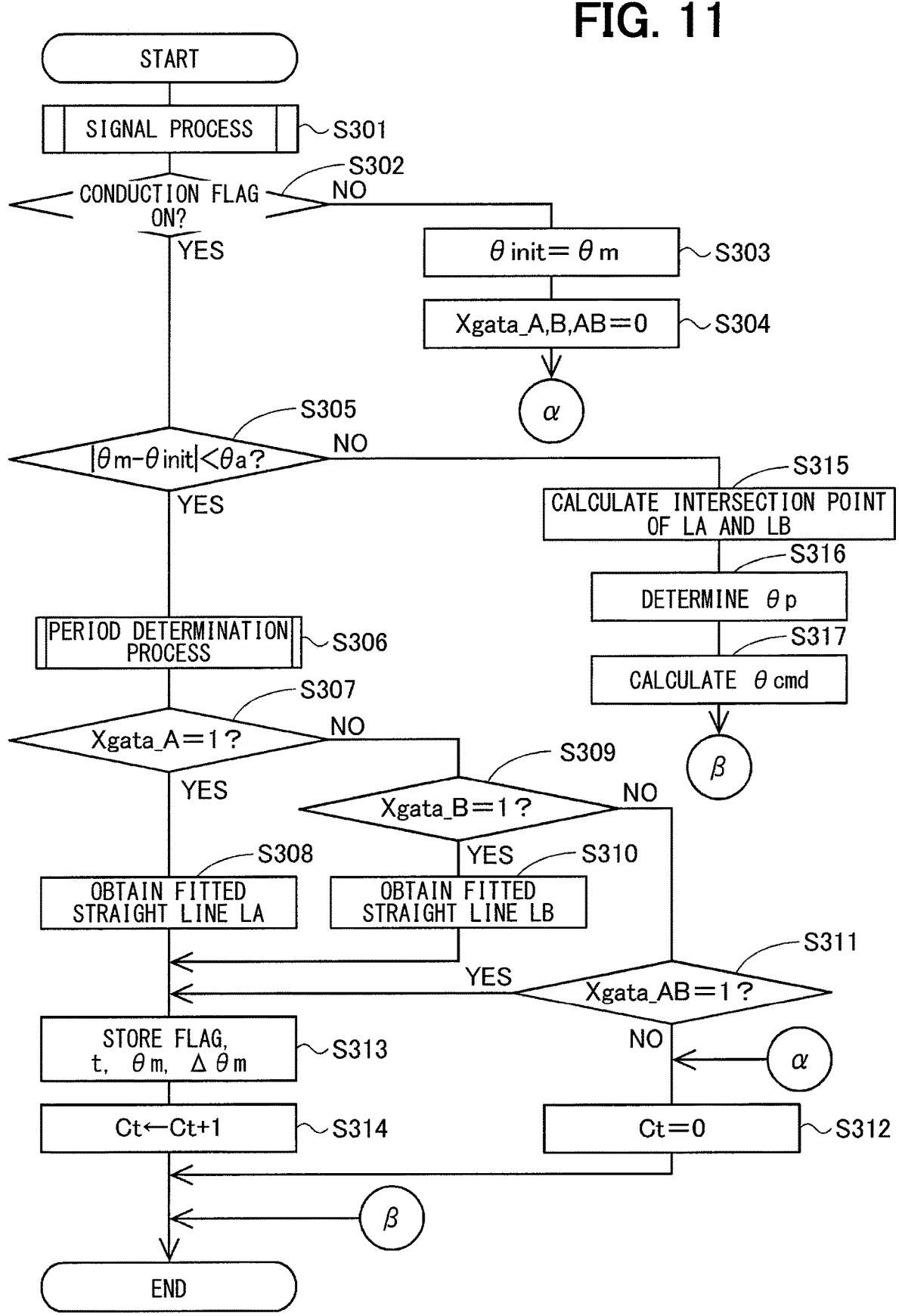
FIG. 11 is a flowchart explaining a target correction process according to a fourth embodiment.
Figure 12:
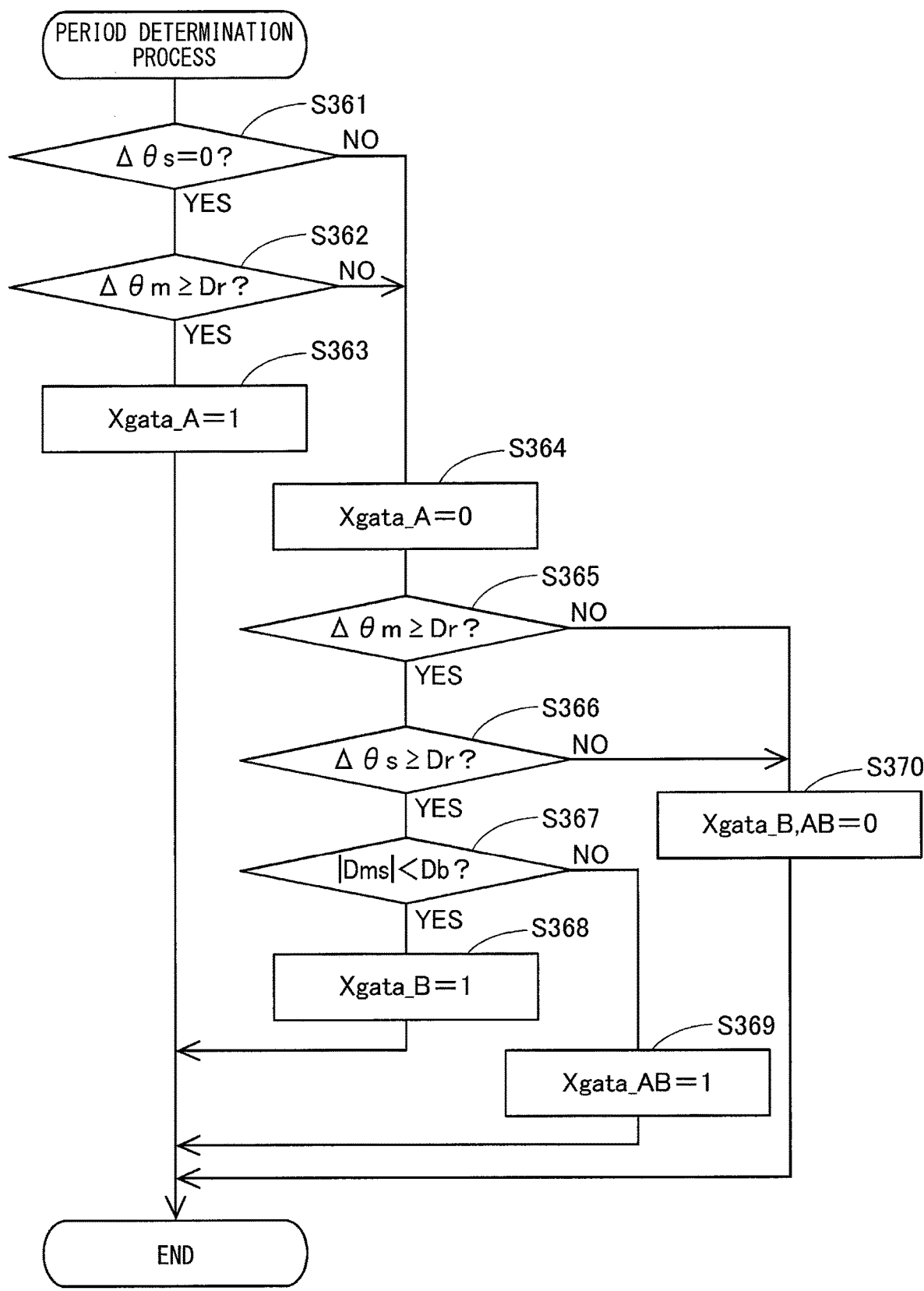
FIG. 12 is a flowchart explaining a period determination process according to the fourth embodiment.
Figure 13:
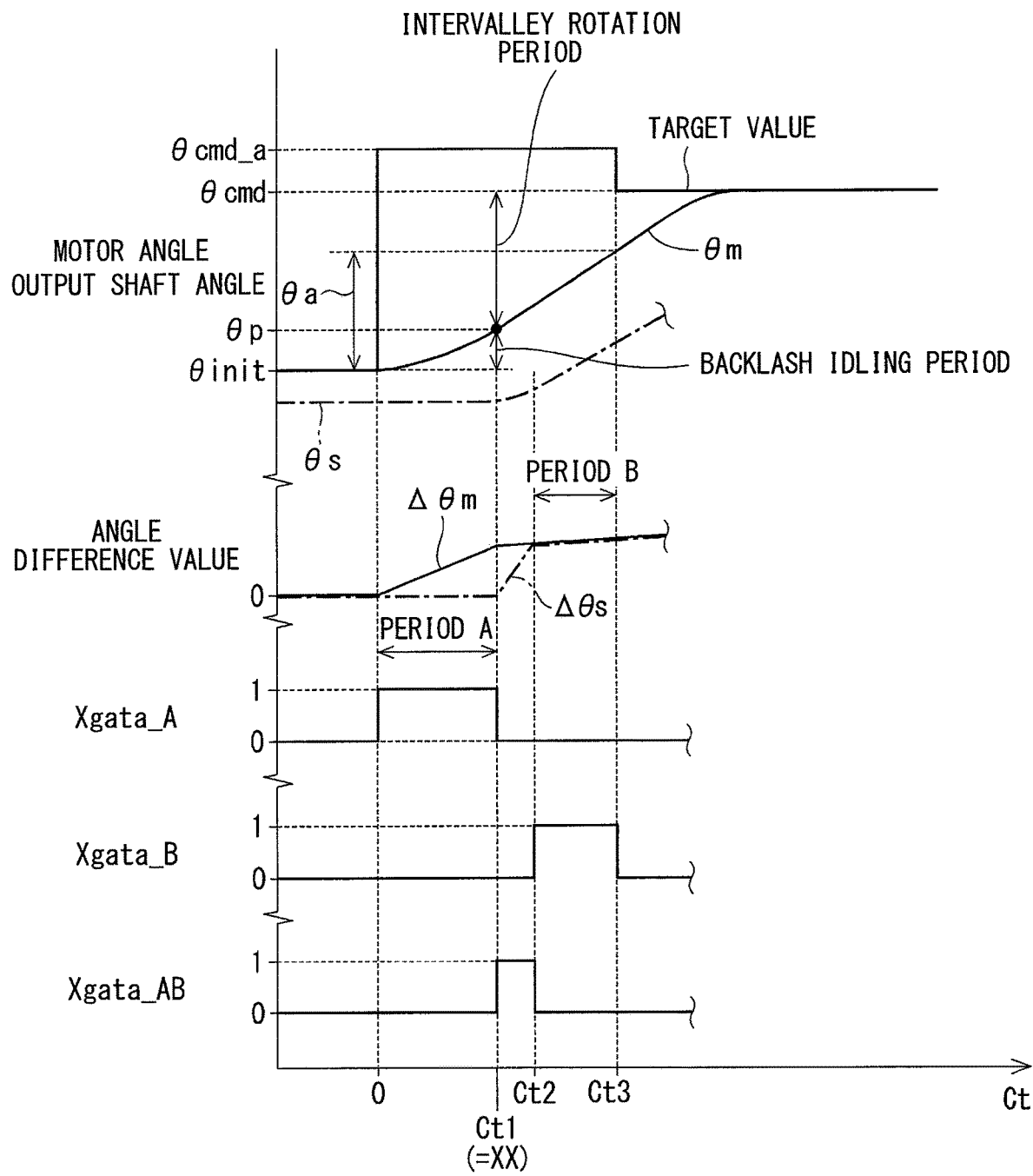
FIG. 13 is a time chart explaining the target correction process according to the fourth embodiment.

A fourth embodiment is shown in FIG. 11 to FIG. 13. The present embodiment differs from the previously described embodiments in the target correction process. Thus, the different feature will mainly be described.

The steps from S301 to S303 are the same as those from S101 to S103 in FIG. 6.

At S304 that follows S303, flags Xgata_A, Xgata_B, and Xgata_AB to be described later are reset, and the process goes to S312.

The step S305 the process goes to if the conduction flag is on (S302: YES) is the same as the step S106. If it is determined that the absolute value of the difference between the motor angle θm and the initial drive value θinit is not less than the initial drive determination value ea (S305: NO), the process goes to S315. If it is determined that the absolute value of the difference between the motor angle θm and the initial drive value θinit is less than the initial drive determination value ea (S305: YES), the process goes to S306.

At S306, a period determination process is performed.

A subflow of the period determination process is shown in FIG. 12.

At S361, the idling determination portion 521 determines whether the output shaft angle change amount Δθs is 0. With detection errors or the like being taken into consideration, if the output shaft angle change amount Δθs is not more than a preset value close to 0, for example, it is determined to be 0. If it is determined that the output shaft angle change amount Δθs is not 0 (S361: NO), the process goes to S364. If it is determined that the output shaft angle change amount Δθs is 0 (S361: YES), the process goes to S362.

The step of S362 is similar to the step of S108 in FIG. 6, where the idling determination portion 521 determines whether the motor angle change amount Δθm is equal to or more than the rotation determination threshold Dr. If it is determined that the motor angle change amount Δθm is equal to or more than the rotation determination threshold Dr (S362: YES), the process goes to S363. If it is determined that the motor angle change amount Δθm is less than the rotation determination threshold Dr (S362: NO), the process goes to S364.

At S363, the idling determination portion 521 turns on Flag A indicative of a backlash idling period.

At S364, the idling determination portion 521 turns off Flag A.

In FIG. 11 to FIG. 13, Flag A is represented as "Xgata_A", and "1" represents the condition where the flag is on, and "0" represents the condition where the flag is off. The same applies to Flag B and Flag AB to be described later.

At S365, similarly to S362, if it is determined that the motor angle change amount Δθm is less than the rotation determination threshold Dr (S365: NO), the process goes to S370. If it is determined that the motor angle change amount Δθm is equal to or more than the rotation determination threshold Dr (S365: YES), the process goes to S366.

At S366, similarly to S109 in FIG. 6, the idling determination portion 521 determines whether the output shaft angle change amount Δθs is equal to or more than the rotation determination threshold Dr. If it is determined that the output shaft angle change amount Δθs is less than the rotation determination threshold Dr (S366: NO), the process goes to S370. If it is determined that the output shaft angle change amount Δθs is equal to or more than the rotation determination threshold Dr (S366: YES), the process goes to S367.

At S367, similarly to S107 in FIG. 6, if it is determined that the absolute value of the change amount difference value Dms is not less than the correspondence determination threshold Db (S367: NO), that is, if the motor angle change amount Δθm and the output shaft angle change amount Δθs do not match, the process goes to S369. If it is determined that the absolute value of the change amount difference value Dms is less than the correspondence determination threshold Db (S367: YES), that is, if the motor angle change amount Δθm and the output shaft angle change amount Δθs match, the process goes to S368.

At S368, the idling determination portion 521 sets Flag B indicative of a period in which the motor 10 and output shaft 15 are rotating together.

At S369, the idling determination portion 521 sets Flag AB indicative of a transition period between a backlash idling state and a state in which the motor 10 and output shaft 15 are rotating together.

At S370, Flag B and Flag AB are turned off.

Returning to FIG. 11, at S307 that follows the period determination process, the idling determination portion 521 determines whether Flag A is on. If it is determined that Flag A is off (S307: NO), the process goes to S309. If it is determined that Flag A is on (S307: YES), the process goes to S308.

At S308 the process goes to if Flag A is on, that is, when it is the idling state, the idling determination portion 521 obtains a fitted straight line of the motor angle change amount Δθm in Period A, with the count value Ct of the timer counter being the X coordinate, and the motor angle change amount Δθm being the Y coordinate. Formula 5 represents the fitted straight line of the motor angle change amount Δθm in Period A.

$$y = ax + c \quad \text{(Formula 5)}$$

At S309 the process goes to if it is determined that Flag A is off (S307: NO), the idling determination portion 521 determines whether Flag B is on. When it is determined that Flag B is off (S309: NO), the process goes to S311. When it is determined that Flag B is on (S309: YES), the process goes to S310.

At S310 the process goes to if Flag B is on, that is, when the motor 10 and output shaft 15 are rotating together, the idling determination portion 521 obtains a fitted straight line of the motor angle change amount $\Delta\theta m$ in Period B, with the count value Ct of the timer counter being the X coordinate, and the motor angle change amount $\Delta\theta m$ being the Y coordinate. Formula 6 represents the fitted straight line of the motor angle change amount $\Delta\theta m$ in Period B.

$$y=cx+d \quad \text{(Formula 6)}$$

Hereinafter, the fitted straight line of the motor angle change amount $\Delta\theta m$ in Period A will be referred to as a "fitted straight line LA", and the fitted straight line of the motor angle change amount $\Delta\theta m$ in Period B as a "fitted straight line LB".

At S311 the process goes to if Flags A and B are both off (S307: NO and S309: NO), the idling determination portion 521 determines whether Flag AB is on. If it is determined that Flag AB is on (S311: YES), the process goes to S313. If it is determined that Flag AB is off (S311: NO), the process goes to S312.

When the answer at S311 is negative, or at S312 that follows S304, the idling determination portion 521 resets the count value Ct of the timer counter.

At S313 the process goes to if one of Flags A, B, and AB is on, the idling determination portion 521 stores, in a memory (not shown), the current count value Ct of the timer counter, motor angle $\theta m$, motor angle change amount $\Delta\theta m$, and flag condition in connection with each other.

At S314, the idling determination portion 521 increments the counter value Ct of the timer counter.

At S315 the process goes to if it is determined that the absolute value of the difference between the motor angle $\theta m$ and the initial drive value $\theta init$ is not less than the initial drive determination value $\theta a$ (S305: NO), the idling determination portion 521 calculates an intersection point of the fitted straight lines LA and LB. In the present embodiment, it is determined that the idling state has ended at the timing when the motor angle change amount $\Delta\theta m$ reaches an inflexion point. The inflexion point of the motor angle change amount $\Delta\theta m$ will be the intersection point of the fitted straight lines LA and LB. A "backlash end point XX", represented by the x coordinate of the intersection point of the fitted straight lines LA and LB, can be expressed by Formula 7. If XX is negative, XX will be regarded as 0.

$$XX=(d-b)/(a-c) \quad \text{(Formula 7)}$$

At S316, the command calculator 52 determines one of the stored motor angles $\theta m$ associated with a count value Ct closest to the backlash end point XX to be the corrected angle value $\theta p$. In the present embodiment, since the count values Ct and motor angles $\theta m$ are discrete values, the count value Ct closest to the backlash end point XX is regarded as representing the "time when idling has ended", so that the corrected angle value $\theta p$ is set based on the motor angle $\theta m$ associated with this count value Ct.

At S317, similarly to S116 in FIG. 6, the target value setting portion 525 calculates a motor angle target value $\theta cmd$ using the corrected angle value $\theta p$.

Now, how the fitted straight lines LA and LB are derived will be described. In the present embodiment, the count value Ct of the timer counter and the motor angle change amount $\Delta\theta m$ are stored in the memory in association with each other at S313. In the present embodiment, the fitted straight line LA is derived by linear approximation with a least squares method, for example, from a plurality of (Ct, $\Delta\theta m$) points associated with Flag A. Similarly, the fitted straight line LB is derived by linear approximation with a least squares method, for example, from a plurality of (Ct, $\Delta\theta m$) points associated with Flag B.

The fitted straight lines LA and LB may be derived by a method other than the least squares technique. The end of idling may be determined by deriving and using other approximate lines such as quadratic or exponential functions instead of linear approximation.

The target value correction process of the present embodiment will be described with reference to the time chart of FIG. 13. FIG. 13 shows the motor angle $\theta m$, output shaft angle $\theta s$, angle change amounts $\Delta\theta m$ and $\Delta\theta s$, Flag A, Flag B, and Flag AB, the horizontal axis representing a common time axis. While the horizontal axis in FIG. 13 is represented as the count value Ct of the timer counter, detailed changes in the motor angle $\theta m$, output shaft angle $\theta s$, and angle change amount $\Delta\theta m$ are the same as those of FIG. 7. The same applies to FIG. 14.

As shown in FIG. 13, the slope of the motor angle change amount $\Delta\theta m$ is different between the backlash idling period and the intervalley rotation period. In the present embodiment, the backlash end point XX is determined using the fact that the slope of the motor angle change amount $\Delta\theta m$ changes at the inflexion point, or the "backlash end point", where the backlash idling ends.

Period A from 0 to Ct1 of the count value corresponds to the backlash idling period. In Period A, the motor angle change amount $\Delta\theta m \neq 0$, output shaft angle change amount $\Delta\theta s=0$, and Flag A is on. The fitted straight line LA is renewed based on (Ct, $\Delta\theta m$) during this period. When the output shaft angle change amount $\Delta\theta s \neq 0$ at counter value Ct1, Flag A is turned off. The fitted straight line LA at this time is fixed.

From count value Ct1 to count value Ct2 where the motor angle change amount $\Delta\theta m$ equals to the output shaft angle change amount $\Delta\theta s$, Flag AB is set. Flag AB being on indicates a transition period from the end of backlash idling until the motor 10 and output shaft 15 start to rotate together, so that fitted straight lines LA and LB are not calculated. During this period, the count value Ct, motor angle $\theta m$, motor angle change amount $\Delta\theta m$, and flag state continue to be stored.

At count value Ct2 where the motor angle change amount $\Delta\theta m$ equals to the output shaft angle change amount $\Delta\theta s$, Flag AB is turned off, and Flag B is turned on. Flag B is kept on until count value Ct3 when the absolute value of the difference between the motor angle $\theta m$ and the initial drive value $\theta init$ becomes equal to or more than the initial drive determination value $\theta a$. The fitted straight line LB is renewed based on (Ct, $\Delta\theta m$) during this period. At count value Ct3 when the absolute value of the difference between the motor angle $\theta m$ and the initial drive value $\theta init$ becomes equal to or more than the initial drive determination value $\theta a$, the fitted straight line LB is fixed.

The backlash end point XX is calculated using the obtained fitted straight lines LA and LB, and the motor angle $\theta m$ at the backlash end point XX is used as the corrected angle value $\theta p$. The motor angle target value $\theta cmd$ is calculated based on the corrected angle value $\theta p$, and the temporary value $\theta cmd\_a$ is changed to the calculated motor angle target value $\theta cmd$. In actuality, there is a computation delay between the time when the fitted straight line LB is fixed at count value Ct and the time when the motor angle target value $\theta cmd$ is changed. Here, for the sake of simplicity, it is assumed that the motor angle target value θcmd is changed at count value Ct3. The timing for changing the motor angle target value θcmd may be anytime after count value Ct3 and before the detent roller 26 rides over a ridge of the detent plate 21.

FIG. 13 indicates that the end timing of Period A corresponds to the backlash end point XX. Depending on calculation results, the calculated backlash end point XX may not match the end timing of Period A. While Period A is longer than Period B in the example of FIG. 13, the lengths of Periods A and B vary depending on the position of the motor shaft 105 within the play when the motor is started, and the setting or the like of the initial drive determination value θa. Period A may not necessarily be longer than Period B. The same applies to FIG. 14 and FIG. 15.

In the present embodiment, the idling determination portion 521 sets Period A and Period B based on the motor angle θm and output shaft angle θs. More specifically, the idling determination portion 521 sets Period A that is the period of idling state, and Period B that is the period in which the motor shaft 105 and output shaft 15 are rotating together, based on the motor angle change amount Δθm and output shaft angle change amount Δθs.

The idling determination portion 521 derives a fitted straight line LA indicative of changes with time of the motor angle change amount Δθm in Period A, and a fitted straight line LB indicative of changes with time of the motor angle change amount Δθm in Period B. The idling determination portion 521 determines that the idling state has ended at the timing corresponding to the intersection point of the fitted straight lines LA and LB.

In the present embodiment, the fitted straight lines LA and LB are determined using the motor angle change amount Δθm at a plurality of time points, and the end of idling is determined based on the intersection point of these lines, for calculation of the corrected angle value θp. Thus, an erroneous determination of the end of idling caused by the influence of noise in the encoder 13 or output shaft sensor 16 is less likely to occur, so that the accuracy of idling end determination and corrected angle value θp is improved.

The same effects as those of the previously described embodiment can be achieved.

In the present embodiment, Period A corresponds to "idling period", Period B corresponds to "integral rotation period", fitted straight line LA corresponds to a "first approximate line", and fitted straight line LB corresponds to a "second approximate line". The "idling period" need not be the entire period of an idling state and it may be part of the period of an idling state. The "integral rotation period" is part of a period in which the motor 10 and output shaft 15 are rotating together, and it is a given time period during which the detent roller 26 is present in the same recess 22 as that before the change of the shift ranges.

In the present embodiment, the motor angle θm and output shaft angle θs are used for the setting of Periods A and B. It should be understood that determination of the end of idling based on fitted straight lines LA and LB as in the present embodiment is included in the concept of "determining the end of an idling state based on a motor angle θm and an output shaft angle θs".

The same applies to the fifth embodiment and the sixth embodiment.

Fifth Embodiment

Figure 14:
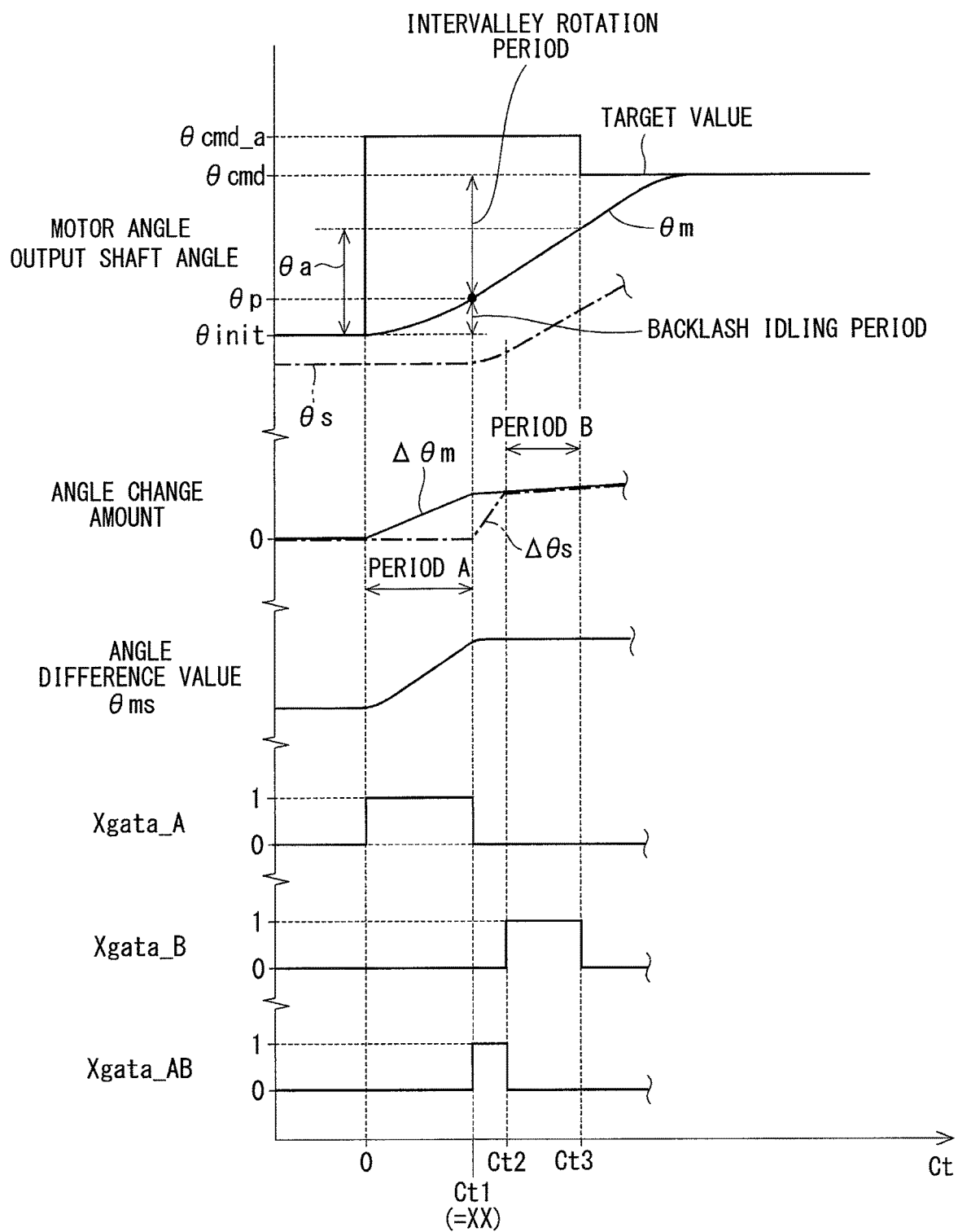
FIG. 14 is a time chart explaining a target correction process according to a fifth embodiment.

A fifth embodiment is shown in FIG. 14. The fifth embodiment and the sixth embodiment are different from the fourth embodiment in respect of the fitted straight lines LA and LB. Thus, the different feature will mainly be described and other features will be omitted.

FIG. 14 shows the motor angle θm, output shaft angle θs, angle change amounts Δθm and Δθs, angle difference value θms, Flag A, Flag B, and Flag AB, the horizontal axis representing a common time axis.

In the fourth embodiment, fitted straight lines of the motor angle change amount Δθm in Periods A and B are obtained, and the end of idling is determined based on the intersection point of the lines.

In the present embodiment, the angle difference value θms (referring to Formula 4) that is the difference between the motor angle θm and the output shaft angle θs is used instead of the motor angle change amount Δθm. The end of idling is determined based on an intersection point of fitted straight lines LA and LB, the fitted straight line LA being the fitted straight line of the angle difference value θms in Period A, and the fitted straight line LB being the fitted straight line of the angle difference value θms in Period B.

As shown in FIG. 14, the slope of the angle difference value θms is different between the backlash idling period and the intervalley rotation period. In the present embodiment, the backlash end point XX and corrected angle value θp are determined using the fact that the slope of the angle difference value θms changes at the inflexion point, or the "backlash end point".

The details of the method of deriving fitted straight lines LA and LB, and the method of determining the backlash end point XX and corrected angle value θp are similar to those of the fourth embodiment except that the angle difference value θms is used instead of the motor angle change amount Δθm.

The angle difference value θms here is obtained by subtracting the output shaft angle θs from the motor angle θm as shown by Formula 4. Instead, a value obtained by subtracting the motor angle θm from the output shaft angle θs may be used as the "angle difference value". Considering that the angle difference value θms becomes 0 when the backlash idling period ends, it can be understood as the "amount of backlash idling". The same applies to the third embodiment.

In the present embodiment, the idling determination portion 521 derives a fitted straight line LA indicative of changes with time of the angle difference value θms in Period A, and a fitted straight line LB indicative of changes with time of the angle difference value θms in Period B. The idling determination portion 521 determines that the idling state has ended at the timing corresponding to the intersection point of the fitted straight lines LA and LB.

In the present embodiment, the fitted straight lines LA and LB are determined using the angle difference value θms at a plurality of time points, and the end of idling is determined based on the intersection point of these lines, for calculation of the corrected angle value θp. Thus, an erroneous determination of the end of idling caused by the influence of noise in the encoder 13 or output shaft sensor 16 is less likely to occur. Moreover, since two sensor values are used for deriving fitted straight lines LA and LB, the accuracy of idling end determination and corrected angle value θp is improved.

The same effects as those of the previously described embodiment can be achieved.

Sixth Embodiment

In the sixth embodiment, the output shaft angle θs is used, that is, the end of idling is determined based on an intersection point of fitted straight lines LA and LB, the fitted straight line LA being a fitted straight line of the output shaft angle θs in Period A, and the fitted straight line LB being a fitted straight line of the output shaft angle θs in Period B.

As shown in FIG. 13 and FIG. 14, the slope of the output shaft angle θs is different between the backlash idling period and the intervalley rotation period. In the present embodiment, the backlash end point XX and corrected angle value θp are determined using the fact that the slope of the angle difference value θms changes at the inflexion point, or the "backlash end point".

The details of the method of deriving fitted straight lines LA and LB, and the method of determining the backlash end point XX and corrected angle value θp are similar to those of the fourth embodiment except that the output shaft angle θs is used instead of the motor angle change amount Δθm.

In the present embodiment, the idling determination portion 521 derives a fitted straight line LA indicative of changes with time of the output shaft angle θs in Period A, and a fitted straight line LB indicative of changes with time of the output shaft angle θs in Period B. The idling determination portion 521 determines that the idling state has ended at the timing corresponding to the intersection point of the fitted straight lines LA and LB.

In the present embodiment, the fitted straight lines LA and LB are determined using the output shaft angle θs at a plurality of time points, and the end of idling is determined based on the intersection point of these lines for calculation of the corrected angle value θp, so that an erroneous determination of the end of idling due to the influence of noise is less likely to occur.

The same effects as those of the previously described embodiment can be achieved.

Other Embodiments

In the embodiments described above, the motor is a permanent magnet three-phase brushless motor. In other embodiments, the motor may be any other motor such as a switched reluctance motor and the like. In the embodiments described above, two sets of windings are provided in the motor. In other embodiments, the number of sets of windings in the motor may be one, or three or more.

In the embodiments described above, the position feedback control adopts a 120° conduction square-wave control scheme. In other embodiments, the position feedback control may adopt a 180° conduction square-wave control scheme. The control scheme is not limited to square-wave control. PWM control with triangle wave comparison or instantaneous vector selection is also possible.

In the embodiments described above, the motor control mode is switched between the position feedback control and the stationary phase conduction control. In other embodiments, the motor drive controller may realize a different control mode instead of at least one of the position feedback control and the stationary phase conduction control. In the embodiments described above, the position feedback control and the stationary phase conduction control are switched over. In other embodiments, the motor control mode may not be changed. Drive of the motor may be controlled by one control mode such as position feedback control or the like, for example. Alternatively, it may be speed feedback control.

The method of controlling the motor can be changed as required depending on the type of the motor being used.

In the embodiments described above, an encoder is used as the rotation angle sensor for detecting the rotation angle of the motor. In other embodiments, the rotation angle sensor need not necessarily be an encoder and any other devices may be used, such as a resolver or the like. In the embodiments described above, the count value of the encoder is subjected to phase advance filtering and used for the position feedback control. In other embodiments, the position feedback control may be performed using the rotation angle itself of the motor, or other values convertible to the motor rotation angle, other than the encoder count. The same applies to selection of a stationary phase in the stationary phase conduction control. In other embodiments, the phase advance filtering process may be omitted.

As long as the output changes continuously in accordance with the rotation of the output shaft, sensors other than a potentiometer may be used as the output shaft sensor.

In the embodiments described above, the detent plate has four recesses. In other embodiments, the number of recesses is not limited to four, and can be any number. For example, the detent plate may have two recesses for switching between P range and "Not P" range. The shift range switching mechanism, parking lock mechanism, and others may be different from those described in the embodiment above.

In the embodiments described above, the speed reducer is provided between the motor shaft and the output shaft. In other embodiments, the speed reducer between the motor shaft and the output shaft may be omitted, or a mechanism other than a speed reducer may be provided. That is, while the description has been mainly given of the embodiments in which the "play" between the motor shaft and the output shaft is present between gears of the speed reducer and the motor shaft, the "play" can be understood as the sum of plays or clearances present between the motor shaft and the output shaft.

The method of determining idling is not limited to those of the embodiments described above. In other embodiments, idling can be determined in any other ways based on the output shaft angle and motor angle.

In the embodiments described above, the motor shaft angle is converted with a gear ratio to be matched with the output shaft angle. In other embodiments, the output shaft angle may be converted with a gear ratio to be matched with the motor shaft angle. Conversion with a gear ratio can be omitted as required if there is no speed reducer provided between the motor shaft and the output shaft.

Therefore, according to one aspect of the present disclosure, a shift range control apparatus changes shift ranges by controlling drive of a motor in a shift range switching system where a play exists between a motor shaft that is a rotation shaft of the motor and an output shaft to which rotation of the motor is transmitted. The shift range control apparatus includes an idling determination portion and a target value setting portion.

The idling determination portion determines, based on a motor angle and an output shaft angle, an end of an idling state in which the motor is rotating within a range of the play, the motor angle being a value based on a detected value of a motor rotation angle sensor that detects the rotation of the motor, the output shaft angle being a value based on a detected value of an output shaft sensor that detects rotation of the output shaft.

The target value setting portion sets a motor angle target value for drive control of the motor using a corrected angle value that is a value corresponding to the motor angle at an end of an idling.

According to a configuration of the present disclosure, the end of an idling state is determined using a motor angle and an output shaft angle, and a motor angle target value is set based on the motor angle at the end of the idling. This enables appropriate setting of a motor angle target value without a process of learning the amount of play. The motor angle and output shaft angle, which are two different types of detected values, are used for the determination of the end of idling. As compared to the case where determination is made using only the output shaft angle as the detected value, the detection accuracy requirements can be made less stringent, and erroneous setting of a motor angle target value caused by the influence of disturbance noise or the like can be prevented.

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of a shift range control apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A shift range control apparatus changing shift ranges by controlling drive of a motor in a shift range switching system where a play exists between a motor shaft that is a rotation shaft of the motor and an output shaft to which rotation of the motor is transmitted, the shift range control apparatus comprising:
   an idling determination portion that determines, based on a motor angle and an output shaft angle, an end of an idling state in which the motor is rotating within a range of the play, the motor angle being a value based on a detected value of a motor rotation angle sensor that detects the rotation of the motor, the output shaft angle being a value based on a detected value of an output shaft sensor that detects rotation of the output shaft; and
   a target value setting portion that sets a motor angle target value for drive control of the motor using a corrected angle value that is a value corresponding to the motor angle at an end of an idling; wherein:
   the idling determination portion determines that the idling state has ended,
   when a motor angle change amount being an amount of change per unit time of the motor angle, is equal to an output shaft angle change amount being an amount of change per unit time of the output shaft angle, and also
   when the motor angle change amount and the output shaft angle change amount are both equal to or more than a rotation determination threshold.

2. The shift range control apparatus according to claim 1, wherein:
   the target value setting portion determines, as the motor angle at the end of the idling, a particular motor angle when a difference value between a motor angle change amount, which is an amount of change per unit time of the motor angle, and an output shaft angle change amount, which is an amount of change per unit time of the output shaft angle, is at peak; and
   the target value setting portion sets the motor angle target value using the particular motor angle as the corrected angle value.

3. A shift range control apparatus changing shift ranges by controlling drive of a motor in a shift range switching system where a play exists between a motor shaft that is a rotation shaft of the motor and an output shaft to which rotation of the motor is transmitted, the shift range control apparatus comprising:
   an idling determination portion that determines, based on a motor angle and an output shaft angle, an end of an idling state in which the motor is rotating within a range of the play, the motor angle being a value based on a detected value of a motor rotation angle sensor that detects the rotation of the motor, the output shaft angle being a value based on a detected value of an output shaft sensor that detects rotation of the output shaft; and
   a target value setting portion that sets a motor angle target value for drive control of the motor using a corrected angle value that is a value corresponding to the motor angle at an end of an idling; wherein:
   the idling determination portion determines that the idling state has ended,
   when an angle difference value that is a difference value between the motor angle and the output shaft angle is greater than a difference determination threshold, and also
   when an amount of change per unit time of the angle difference value becomes 0.

4. The shift range control apparatus according to claim 3, wherein:
   the target value setting portion determines, as the motor angle at the end of the idling, a particular motor angle when a difference value between a motor angle change amount, which is an amount of change per unit time of the motor angle, and an output shaft angle change amount, which is an amount of change per unit time of the output shaft angle, is at peak; and
   the target value setting portion sets the motor angle target value using the particular motor angle as the corrected angle value.

5. A shift range control apparatus changing shift ranges by controlling drive of a motor in a shift range switching system where a play exists between a motor shaft that is a rotation shaft of the motor and an output shaft to which rotation of the motor is transmitted, the shift range control apparatus comprising:
   an idling determination portion that determines, based on a motor angle and an output shaft angle, an end of an idling state in which the motor is rotating within a range of the play, the motor angle being a value based on a detected value of a motor rotation angle sensor that detects the rotation of the motor, the output shaft angle being a value based on a detected value of an output shaft sensor that detects rotation of the output shaft; and
   a target value setting portion that sets a motor angle target value for drive control of the motor using a corrected angle value that is a value corresponding to the motor angle at an end of an idling; wherein:
   the target value setting portion determines, as the motor angle at the end of the idling, a particular motor angle when a difference value between a motor angle change amount, which is an amount of change per unit time of the motor angle, and an output shaft angle change amount, which is an amount of change per unit time of the output shaft angle, is at peak; and
   the target value setting portion sets the motor angle target value using the particular motor angle as the corrected angle value.

6. A shift range control apparatus changing shift ranges by controlling drive of a motor in a shift range switching system where a play exists between a motor shaft that is a rotation shaft of the motor and an output shaft to which rotation of the motor is transmitted, the shift range control apparatus comprising:
- an idling determination portion that determines, based on a motor angle and an output shaft angle, an end of an idling state in which the motor is rotating within a range of the play, the motor angle being a value based on a detected value of a motor rotation angle sensor that detects the rotation of the motor, the output shaft angle being a value based on a detected value of an output shaft sensor that detects rotation of the output shaft; and
- a target value setting portion that sets a motor angle target value for drive control of the motor using a corrected angle value that is a value corresponding to the motor angle at an end of an idling; wherein:
- the idling determination portion sets, based on the motor angle and the output shaft angle, an idling period that is a period of the idling state and an integral rotation period that is a period in which the motor shaft and the output shaft are rotating together;
- the idling determination portion obtains a first approximate line that is an approximate line representing changes with time of a motor angle change amount being an amount of change per unit time of the motor angle in the idling period, and a second approximate line that is an approximate line representing changes with time of the motor angle change amount in the integral rotation period; and
- the idling determination portion determines that the idling state has ended at a timing corresponding to an intersection point of the first approximate line and the second approximate line.

7. A shift range control apparatus changing shift ranges by controlling drive of a motor in a shift range switching system where a play exists between a motor shaft that is a rotation shaft of the motor and an output shaft to which rotation of the motor is transmitted, the shift range control apparatus comprising:
- an idling determination portion that determines, based on a motor angle and an output shaft angle, an end of an idling state in which the motor is rotating within a range of the play, the motor angle being a value based on a detected value of a motor rotation angle sensor that detects the rotation of the motor, the output shaft angle being a value based on a detected value of an output shaft sensor that detects rotation of the output shaft; and
- a target value setting portion that sets a motor angle target value for drive control of the motor using a corrected angle value that is a value corresponding to the motor angle at an end of an idling; wherein:
- the idling determination portion sets, based on the motor angle and the output shaft angle, an idling period that is a period of the idling state, and an integral rotation period that is a period in which the motor shaft and the output shaft are rotating together;
- the idling determination portion obtains a first approximate line that is an approximate line representing changes with time of an angle difference value being a difference value between the motor angle and the output shaft angle in the idling period, and a second approximate line that is an approximate line representing changes with time of the angle difference value in the integral rotation period; and
- the idling determination portion determines that the idling state has ended at a timing corresponding to an intersection point of the first approximate line and the second approximate line.

8. A shift range control apparatus changing shift ranges by controlling drive of a motor in a shift range switching system where a play exists between a motor shaft that is a rotation shaft of the motor and an output shaft to which rotation of the motor is transmitted, the shift range control apparatus comprising:
- an idling determination portion that determines, based on a motor angle and an output shaft angle, an end of an idling state in which the motor is rotating within a range of the play, the motor angle being a value based on a detected value of a motor rotation angle sensor that detects the rotation of the motor, the output shaft angle being a value based on a detected value of an output shaft sensor that detects rotation of the output shaft; and
- a target value setting portion that sets a motor angle target value for drive control of the motor using a corrected angle value that is a value corresponding to the motor angle at an end of an idling; wherein:
- the idling determination portion sets, based on the motor angle and the output shaft angle, an idling period that is a period of the idling state, and an integral rotation period that is a period in which the motor shaft and the output shaft are rotating together;
- the idling determination portion obtains a first approximate line that is an approximate line representing changes with time of the output shaft angle in the idling period, and a second approximate line that is an approximate line representing changes with time of the output shaft angle in the integral rotation period; and
- the idling determination portion determines that the idling state has ended at a timing corresponding to an intersection point of the first approximate line and the second approximate line.

9. A shift range control apparatus changing shift ranges by controlling drive of a motor in a shift range switching system where a play exists between a motor shaft and an output shaft, the shift range control apparatus comprising:
- at least one processor that is configured to
- determine, based on a motor angle and an output shaft angle, an end of an idling state in which the motor is rotating within a range of the play, the motor angle being a value based on a detected value of a motor rotation angle sensor that detects the rotation of the motor, the output shaft angle being a value based on a detected value of an output shaft sensor that detects rotation of the output shaft,
- set a motor angle target value for drive control of the motor using a corrected angle value that is a value corresponding to the motor angle at an end of an idling, and
- determine that the idling state has ended,
  - when a motor angle change amount being an amount of change per unit time of the motor angle, is equal to an output shaft angle change amount being an amount of change per unit time of the output shaft angle, and also
  - when the motor angle change amount and the output shaft angle change amount are both equal to or more than a rotation determination threshold.

* * * * *